US 8,848,696 B2

(12) United States Patent
Altberg et al.

(10) Patent No.: US 8,848,696 B2
(45) Date of Patent: *Sep. 30, 2014

(54) SYSTEMS AND METHODS TO FACILITATE SEARCHES OF COMMUNICATION REFERENCES

(71) Applicant: YP Interactive LLC, Wilmington, DE (US)

(72) Inventors: Ebbe Altberg, Mill Valley, CA (US); Scott Faber, San Francisco, CA (US); Ron Hirson, San Francisco, CA (US); Sean Van Der Linden, Berkeley, CA (US); Paul G. Manca, Oakland, CA (US)

(73) Assignee: YP Interactive LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,040

(22) Filed: Mar. 5, 2013

(65) Prior Publication Data

US 2013/0176909 A1    Jul. 11, 2013

Related U.S. Application Data

(63) Continuation of application No. 12/114,603, filed on May 2, 2008, now Pat. No. 8,396,054.

(60) Provisional application No. 60/915,914, filed on May 3, 2007.

(51) Int. Cl.
| | | |
|---|---|---|
| *H04M 15/00* | (2006.01) | |
| *G06Q 30/02* | (2012.01) | |
| *G06Q 50/10* | (2012.01) | |
| *G06Q 30/06* | (2012.01) | |
| *H04L 12/64* | (2006.01) | |

(52) U.S. Cl.
CPC ............... *H04M 15/09* (2013.01); *G06Q 30/02* (2013.01); *G06Q 50/10* (2013.01); *G06Q 30/0601* (2013.01); *H04L 12/6418* (2013.01)
USPC .......................................... 370/352; 370/259

(58) Field of Classification Search
USPC ......................... 370/352, 259; 709/227, 203; 707/999.003; 379/114.05
See application file for complete search history.

(56) References Cited

U.S. PATENT DOCUMENTS

| | | |
|---|---|---|
| 4,741,025 A | 4/1988 | Maruyama et al. |
| 4,788,718 A | 11/1988 | McNabb et al. |

(Continued)

FOREIGN PATENT DOCUMENTS

| | | |
|---|---|---|
| GB | 2329046 | 3/1999 |
| JP | 2002278858 | 9/2002 |

(Continued)

OTHER PUBLICATIONS

"Applying Technology News," Accounting Technology, p. 14, Feb./Mar. 1997.

(Continued)

*Primary Examiner* — Khaled Kassim
*Assistant Examiner* — Parth Patel
(74) *Attorney, Agent, or Firm* — Greenberg Traurig LLP

(57) ABSTRACT

Methods and apparatuses to facilitate searches of communication references for real time communication connections. One embodiment includes: one or more web servers to assign a communication reference to an advisor for distribution by the advisor in one or more documents, to associate at least one keyword with the communication reference, to receive from the advisor a bid price on the keyword associated with the communication reference, and to present the communication reference selected based at least in part on the bid price in response to a search related to the keyword; a session border controller to interface with a packet switched network; and one or more telecommunication servers to determine contact information of the advisor based on the communication reference used by a customer to request a communication connection to the advisor, and to connect the customer to the advisor for real time communications using the determined contact information.

23 Claims, 24 Drawing Sheets

(56) References Cited

U.S. PATENT DOCUMENTS

| | | |
|---|---|---|
| 4,796,293 A | 1/1989 | Blinken et al. |
| 5,099,510 A | 3/1992 | Blinken, Jr. et al. |
| 5,361,295 A | 11/1994 | Solomon et al. |
| 5,373,549 A | 12/1994 | Bales et al. |
| 5,436,957 A | 7/1995 | McConnell |
| 5,483,352 A | 1/1996 | Fukuyama et al. |
| 5,483,588 A | 1/1996 | Eaton et al. |
| 5,539,813 A | 7/1996 | Jonsson |
| 5,544,237 A | 8/1996 | Bales et al. |
| 5,555,298 A | 9/1996 | Jonsson |
| 5,559,875 A | 9/1996 | Bieselin et al. |
| 5,608,786 A | 3/1997 | Gordon |
| 5,619,555 A | 4/1997 | Fenton et al. |
| 5,644,715 A | 7/1997 | Baugher |
| 5,689,553 A | 11/1997 | Ahuja et al. |
| 5,740,549 A | 4/1998 | Reilly et al. |
| 5,774,534 A | 6/1998 | Mayer |
| 5,793,851 A | 8/1998 | Albertson |
| 5,841,763 A | 11/1998 | Leondires et al. |
| 5,850,433 A | 12/1998 | Rondeau |
| 5,862,223 A | 1/1999 | Walker et al. |
| 5,903,635 A | 5/1999 | Kaplan |
| 5,937,390 A | 8/1999 | Hyodo |
| 5,991,394 A | 11/1999 | Dezonno et al. |
| 6,131,085 A | 10/2000 | Rossides |
| 6,223,165 B1 | 4/2001 | Lauffer |
| 6,301,350 B1 | 10/2001 | Henningson et al. |
| 6,393,117 B1 | 5/2002 | Trell |
| 6,470,079 B1 | 10/2002 | Benson |
| 6,529,946 B2 | 3/2003 | Yokono et al. |
| 6,535,506 B1 | 3/2003 | Narain et al. |
| 6,570,870 B1 | 5/2003 | Berstis |
| 6,690,672 B1 | 2/2004 | Klein |
| 6,769,020 B2 | 7/2004 | Miyazaki et al. |
| 6,856,809 B2 | 2/2005 | Fostick |
| 6,882,985 B1 | 4/2005 | Kay et al. |
| 7,010,293 B2 | 3/2006 | Go |
| 7,085,555 B2 | 8/2006 | Zellner et al. |
| 7,120,235 B2 | 10/2006 | Altberg et al. |
| 7,177,415 B1 | 2/2007 | Kim et al. |
| 7,224,781 B2 | 5/2007 | Jacob et al. |
| 7,240,290 B2 | 7/2007 | Melideo |
| 7,305,489 B2 | 12/2007 | Puthiyandyil |
| 7,340,048 B2 | 3/2008 | Stern et al. |
| 7,343,317 B2 | 3/2008 | Jokinen et al. |
| 7,363,254 B2 | 4/2008 | Skinner |
| 7,366,683 B2 | 4/2008 | Altberg et al. |
| 7,380,139 B2 | 5/2008 | Tagawa et al. |
| 7,428,497 B2 | 9/2008 | Agarwal et al. |
| 7,450,566 B2 | 11/2008 | Wong |
| 7,508,923 B1 | 3/2009 | Samaarasinghe |
| 7,533,144 B2 | 5/2009 | Kassab |
| 7,548,915 B2 | 6/2009 | Ramer et al. |
| 7,650,137 B2 | 1/2010 | Jobs et al. |
| 7,697,894 B2 | 4/2010 | Zilliacus et al. |
| 7,734,502 B1 | 6/2010 | Yehoshua et al. |
| 7,876,886 B2 | 1/2011 | Altberg et al. |
| 8,027,878 B2 | 9/2011 | Wong et al. |
| 8,396,054 B2 * | 3/2013 | Altberg et al. ............ 370/352 |
| 8,599,832 B2 | 12/2013 | Altberg et al. |
| 2001/0027481 A1 | 10/2001 | Whyel |
| 2002/0019737 A1 | 2/2002 | Stuart et al. |
| 2002/0028681 A1 | 3/2002 | Lee et al. |
| 2002/0075844 A1 | 6/2002 | Hagen |
| 2002/0095331 A1 | 7/2002 | Osman et al. |
| 2002/0095367 A1 | 7/2002 | Mizunuma et al. |
| 2002/0124188 A1 | 9/2002 | Sherman et al. |
| 2002/0133446 A1 | 9/2002 | Lee |
| 2002/0167919 A1 | 11/2002 | Marples et al. |
| 2002/0191762 A1 | 12/2002 | Benson |
| 2003/0046161 A1 | 3/2003 | Kamangar et al. |
| 2003/0147519 A1 | 8/2003 | Jain et al. |
| 2003/0220866 A1 | 11/2003 | Pisaris-Henderson et al. |
| 2004/0083133 A1 | 4/2004 | Nicholas et al. |
| 2004/0103024 A1 | 5/2004 | Patel et al. |
| 2004/0234043 A1 | 11/2004 | Argo |
| 2004/0234064 A1 | 11/2004 | Melideo |
| 2004/0243939 A1 | 12/2004 | Perepa et al. |
| 2004/0249951 A1 | 12/2004 | Grabelsky |
| 2004/0254859 A1 | 12/2004 | Aslanian |
| 2005/0018849 A1 | 1/2005 | Rodriguez et al. |
| 2005/0044238 A1 | 2/2005 | Jacob et al. |
| 2005/0049971 A1 | 3/2005 | Bettinger |
| 2005/0074102 A1 | 4/2005 | Altberg et al. |
| 2005/0086104 A1 | 4/2005 | McFadden |
| 2005/0094623 A1 | 5/2005 | D'Eletto |
| 2005/0114208 A1 | 5/2005 | Arbuckle et al. |
| 2005/0165666 A1 | 7/2005 | Wong et al. |
| 2005/0216341 A1 | 9/2005 | Agarwal et al. |
| 2005/0222908 A1 | 10/2005 | Altberg et al. |
| 2005/0245274 A1 | 11/2005 | Oishi et al. |
| 2005/0251445 A1 | 11/2005 | Wong et al. |
| 2005/0256766 A1 | 11/2005 | Garcia et al. |
| 2005/0289097 A1 | 12/2005 | Trossen et al. |
| 2006/0004789 A1 | 1/2006 | Lunt et al. |
| 2006/0031516 A1 | 2/2006 | Kumer |
| 2006/0074760 A1 | 4/2006 | Helin |
| 2006/0075104 A1 | 4/2006 | Kumer |
| 2006/0078096 A1 | 4/2006 | Poyhonen et al. |
| 2006/0095343 A1 | 5/2006 | Clarke et al. |
| 2006/0106711 A1 | 5/2006 | Melideo |
| 2006/0165068 A1 | 7/2006 | Dalton et al. |
| 2006/0178916 A1 | 8/2006 | Domnin |
| 2006/0184417 A1 | 8/2006 | Van der Linden et al. |
| 2006/0245576 A1 | 11/2006 | Henry |
| 2007/0005585 A1 | 1/2007 | Feng et al. |
| 2007/0042760 A1 | 2/2007 | Roth |
| 2007/0060173 A1 | 3/2007 | Ramer et al. |
| 2007/0112656 A1 | 5/2007 | Howe et al. |
| 2007/0116217 A1 | 5/2007 | Altberg et al. |
| 2007/0121848 A1 | 5/2007 | Faber et al. |
| 2007/0124206 A1 | 5/2007 | Faber et al. |
| 2007/0130338 A1 | 6/2007 | Malik et al. |
| 2007/0157229 A1 | 7/2007 | Heathcock |
| 2007/0160076 A1 | 7/2007 | Faber et al. |
| 2007/0177578 A1 | 8/2007 | Anspach et al. |
| 2007/0202881 A1 | 8/2007 | Dervan |
| 2007/0206506 A1 | 9/2007 | Purpura |
| 2007/0230374 A1 | 10/2007 | Altberg et al. |
| 2007/0230671 A1 | 10/2007 | Altberg et al. |
| 2007/0230679 A1 | 10/2007 | Altberg et al. |
| 2007/0242626 A1 | 10/2007 | Altberg et al. |
| 2007/0268858 A1 | 11/2007 | Soto |
| 2008/0005268 A1 | 1/2008 | Chen |
| 2008/0008306 A1 | 1/2008 | Kliger |
| 2008/0059299 A1 | 3/2008 | Hamoui |
| 2008/0071554 A1 | 3/2008 | Miles et al. |
| 2008/0090609 A1 | 4/2008 | Walter et al. |
| 2008/0107102 A1 | 5/2008 | Kaufman et al. |
| 2008/0144604 A1 | 6/2008 | Sharma et al. |
| 2008/0194260 A1 | 8/2008 | Altberg et al. |
| 2009/0113312 A1 | 4/2009 | Schoenberg |
| 2009/0138317 A1 | 5/2009 | Schoenberg |
| 2009/0323670 A1 | 12/2009 | Altberg et al. |
| 2010/0191657 A1 | 7/2010 | Melideo |
| 2012/0278467 A1 | 11/2012 | Schneider |

FOREIGN PATENT DOCUMENTS

| | | |
|---|---|---|
| JP | 2003337896 | 11/2003 |
| JP | 2005141583 | 6/2005 |
| KR | 20010086595 | 9/2001 |
| KR | 20030035646 | 5/2003 |
| KR | 20030043827 | 6/2003 |
| KR | 20050014963 | 5/2005 |
| KR | 20050086166 | 8/2005 |
| WO | 0057326 | 9/2000 |
| WO | 0127825 | 4/2001 |
| WO | 0128141 | 4/2001 |
| WO | 0244870 | 6/2002 |

(56) References Cited

FOREIGN PATENT DOCUMENTS

| WO | 03102738 | 12/2003 |
|---|---|---|
| WO | 2005040962 | 5/2005 |
| WO | 2008070327 | 6/2008 |

OTHER PUBLICATIONS

"TriNet's 'Help Me, I'm Stuck' Internet Voice Button Services Pushes Web Pages to Online Users," Business Wire, Mar. 25, 1998.
Allexperts.com, company information retrieved from http://www.allexperts.com, available at least by Apr. 9, 2000.
Answers.com, company information retrieved from http://www.answers.com, available at least by Aug. 8, 2000.
Dalton, Gregory, "Rent-An-Expert on the Web," Information Week, p. 75, Sep. 6, 1999.
Exp.com, Inc., company information retrieved from http://www.exp.com, available at least by Sep. 20, 2000.
Expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
Sterling, Greg, "Ingenio's Ether—Pay Per Professional Advice," Search Engine Journal, Mar. 3, 2006.
University of Texas—Austin, information on the Electronic Emissary Project retrieved at www.tapr.org/emissary, available at least by Apr. 9, 2000.
Wasik, Joann M., "Information for Sale: Commercial Digital Reference and AskA Services," Virtual Reference Desk, http://www.vrd.org/AskAcommAskA.html, Sep. 20, 1999.
Wieland, Heidi et al., "Expertcity.com Launches Premier Online Marketplace for Expert Services," PR Newswire, Aug. 30, 1999.
CCBN, Inc. "Full Year 2003 and Q4 Ebookers PLC Earnings Conference Call—Part 2," Fair Disclosure Wire, Mar. 22, 2004.
International Application No. PCT/US05/12061, Written Opinion and International Search Report, Nov. 17, 2006.
International Application No. PCT/US07/82445, Written Opinion and International Search Report, May 23, 2008.
International Application No. PCT/US2008/059687, Written Opinion and International Search Report, Aug. 25, 2008.
International Application No. PCT/US04/15238, Written Opinion and International Search Report, Aug. 29, 2005.
International Application No. PCT/US2008/053316, Written Opinion and International Search Report, Jun. 26, 2008.

\* cited by examiner

| Number of downloads of a web page that contains an Ether button | 1051 |
| Number of calls generated from the web page that contains the Ether button | 1053 |
| Number of successful phone connections made via the Ether button contained in the web page | 1055 |
| Average call time for calls connected via the Ether button contained in the web page | 1057 |
| Number of repeated/revisit calls via the Ether button contained in the web page | 1059 |
| Customer feedback for calls connected via the Ether button contained in the web page | 1061 |

SYSTEMS AND METHODS TO FACILITATE SEARCHES OF COMMUNICATION REFERENCES

CROSS-REFERENCE TO RELATED APPLICATION

The present application is a continuation application of co-pending U.S. patent application Ser. No. 12/114,603, filed May 2, 2008, which claims priority from Provisional U.S. Patent Application Ser. No. 60/915,914, filed May 3, 2007, the disclosures of which are hereby incorporated herein by reference.

The present application is a related to U.S. patent application Ser. No. 11/329,459, filed Jan. 10, 2006 and entitled "Systems and Methods to Provide Availability Indication," and U.S. patent application Ser. No. 11/696,151, filed Apr. 3, 2007 and entitled "Systems and Methods to Facilitate Searches," which claims the priority from Provisional U.S. Patent Application Ser. No. 60/888,876, filed Feb. 8, 2007 and entitled "Systems and Methods to Facilitate Searches." The disclosures of the above applications are hereby incorporated herein by reference.

TECHNOLOGY FIELD

At least some embodiments of the disclosure relate to user interface techniques to assist people to connect for real-time communication, such as connecting people for telephonic conversation, chat, document sharing, screen-sharing, etc.

BACKGROUND

Internet, cellular communication systems, television, newspaper, etc., provide diverse communication media channels through which people may receive information and/or communicate with each other.

People may use a web site to chronologically publish personal thoughts and web links. Such a web site may be referred to as a blog. A blog may include content showing what is happening in the life of the person, collecting information on certain types of subjects of interest to the person, providing links to related web sites, etc. Thus, a personal web site may include a collection of contents that may be helpful to people of similar interest.

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet-switched network for a telephone connection. A packet switched network is typical in a computer data environment. Recent developments in the field of Voice over IP (VoIP) allow the delivery of voice information using the Internet Protocol, in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

BRIEF DESCRIPTION OF THE DRAWINGS

The disclosure is illustrated by way of example and not limitation in the figures of the accompanying drawings in which like references indicate similar elements.

FIG. 18 illustrates statistic data collected to facilitate searches according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure can be, but not necessarily are, references to the same embodiment; and, such references mean at least one.

In one embodiment, a system is to provide services to people who wish to make connections for real time communication, such as live telephone conversation, chat, video conferencing, instant messaging, and other forms of real time communications.

For example, benefits of the services may include anonymity for one or more of the parties of the real time communication. For example, the service can connect the caller and callee without revealing the contact information of one party to another, such as the actual telephone number. The services may include filtering callers/participants so that only those who are willing to pay can get connected. The services may include collecting payments for the callee so that the callee can earn money from talking to the callers over the phone without the burden of managing payment collection, etc. The services may include scheduling so that the real time communication is initiated at a convenient time (e.g., no night calls). The services may include queue managing to serve both the callees and the callers. The services may include providing the cool, convenient click-to-call functionality to attract callers for the callees.

In one embodiment, the services may include providing a persistent and consistent way to reach people. For example, a web link, or a toll-free number, or a local phone number can be provided by the system so that the callers can reach the callee using the web link, or the toll-free number, or the local phone number even after the telephone of the callee has been changed. The callee can publish the web link and/or the phone number, knowing that the calls will follow if the callee updates the telephone number in the system. The callees do not need to reveal their actual telephone numbers to the potential callers. If desired, the callee can keep the caller from knowing the actual telephone number of the callee for anonymity.

In general, the service may provide any combination of the benefits discussed above.

Many examples are presented in the context of telephone connection for real time conversation. Embodiments can also be applied to other real time communication systems (e.g., text chat, instant messaging, voice/video conferencing, etc.) in a way similar to the telephone conversation.

Figure 1:
FIG. 1 illustrates a system according to one embodiment.

FIG. 1 illustrates a system according to one embodiment. As illustrated in FIG. 1, callees who have customers, fans, far-away clients, etc., can make money talking with them on the phone. The system provides the callees with services of managing the transactions such that the callees can sell what they have to say with reduced/minimum efforts on business aspects. For example, a blogger can earn money from the blog by talking to the interested readers of the blog.

In one embodiment, the callee can sign up for a call button of the system and/or for a phone number provided by the system. The call button and/or the assigned phone number can be used as the contact information of the callee. For example, the callee can publish the call button and/or the phone number in a variety of media channels and environments, such as in the blog, in advertisements, in news articles, in column discussions, in business cards, etc.

In one embodiment, the callees manage their own distribution of the call button and/or the phone number, since the callees may have their unique ways to reach potential callers (e.g., through blogs, home pages, business cards, etc.). The callees can bring the call button and/or the phone number into the context where the customers of the callees are, such as their own web pages or blogs or business cards (e.g., via a phone number).

Alternative, or in combination, the system may also help the callees to reach callers through presenting the call buttons and/or the phone numbers in marketplaces, such as online listings of services, advertisements embedded in the search results generated by a search engine, classified advertisements, etc.

After signing up for the call button and/or the phone number, the callees can set up their own prices and their own hours for receiving the calls. When the call button and/or the phone number leads the callers to callees, the callees can earn money by talking to the callers without having to manage scheduling, queue, payment collection, privacy, etc. For example, the callees can enjoy the benefit of anonymity provided by the system, since the callees do not have to reveal their actual phone numbers to the potential callers in order to receive calls. The system provides the filtering functionality so that some callers can reach the callees.

In one embodiment, the services of the system are packaged and delivered through the use of a call button and/or a communication reference (such as a phone number) assigned to the callee. The callees do not have to rely upon a marketplace, such as keen.com, to reach callers.

Figure 2:
FIG. 2 illustrates a user interface to create a listing according to one embodiment.

FIG. 2 illustrates a user interface to create a listing according to one embodiment. In FIG. 2, the callee can specify the rate the callee will charge the callers when the callers want to talk to the callee.

In one embodiment, the callee may specify the price (rate) in terms of a package, such as $100 for one hour. A call package has a specified price for a given time limit that is longer than one minute (e.g., one hour). Alternatively, the callee may specify the price in terms of a price per unit of time, such as $2 per minute, without specifying a time limit.

In one embodiment, when the rate is specified as a package that includes a time limit (e.g., 60 minutes, two hours, etc.), the callee can further specify the policy for the continuation of the call beyond the time limit (e.g., $50 per 30 minutes thereafter, or end call, or no longer charge).

In the user interface illustrated in FIG. 2, the callee can specify the phone number (e.g., 415-861-6100) at which the system will call the callee when a customer wishes to speak to the callee. The phone number is used by the system to call the callee and make a connection to the customer. The phone number of the callee is not provided to callers (customers of the callee) for anonymity.

In one embodiment, the callee may specify a listing name (e.g., for this listing). The callee may create multiple listings with different rates, phone numbers, etc., in the same account. Optionally, the callee may further provide a description and a photo (e.g., a photo of the callee) for the listing.

In one embodiment, the photo of the listing should be no larger than 70 pixels wide by 70 pixels high and should be in either GIF or JPEG format. Alternatively, the system may automatically convert the image uploaded from the callee into the appropriate size and format. However, it is understood that other sizes can also be used.

After the listing is created, the callee can select the button "Continue" to access the next screen for getting the call button.

In one embodiment, the web server of the system provides the callee with: a call button and/or a phone number, such as 1-800-GO-ETHER extension XXXX, after the callee finishes creating the listing. The call button and the phone number assigned to the callee are intended for the callee to place wherever a caller (buyer) will come across them.

For example, a golf pro provides great swing tips. The golf pro as a callee (seller) can put a call button on a blog, on a web page, in the footer of an email, etc. When people are reading the blog about golf equipment, they might think "I'm really interested in what this person has to say, I think I'll pay to talk to them live and ask them all my questions."

In one embodiment, the call button includes HTML (Hypertext Markup Language) code which contains a reference to the listing and one or more links to a server of the system. The HTML code can be inserted into the blog and/or the home page of the callee, or an email. When the HTML code is rendered in the browser of the caller (e.g., when the caller visits the blog or the home page of the callee, or when the caller views an email from the callee), the browser shows a call button which can be selected (e.g., through "clicking" on the call button using a cursor controlling device, such as a mouse, a track ball, a joystick, a touch screen, etc.) to request a phone connection. An example of the appearance of a call button includes an icon showing a telephone set and the text "call now", as illustrated in FIG. 1.

In one embodiment, when the call button is rendered, the appearance of the call button may include an icon, which when selected or activated can initiated a request for a real time communication connection.

Alternative, the call button can be specified in documents in a format other than HTML, such as in an extensible markup language (XML).

In one embodiment, the call button can change its state depending on the state of the caller and/or callee. For instance, if the callee is already on a phone call with a caller, the button would indicate "busy," so that a second caller would see that the callee is already on a telephone. Clicking on the button in this instance would give the second caller the ability to get in line to talk to the callee. Or, in another embodiment, the second caller clicking on the button could give him the ability to join the call in progress.

In one embodiment, the call button can change its state depending on what the callee explicitly indicates. The callee could, for instance, tell the system, via a web form or telephone IVR, that he is currently "taking calls" or "not taking calls" or "offering video" or "offering chat" or "taking appointments" or taking "arranged calls" or "callbacks." He could indicate that he is taking calls and is "by my phone," indicating a heightened presence. Depending upon each of such states, the system would lead callers down different communication paths. If a callee is "by my [his/her] phone," the system might call the caller first, since it's highly probably that the callee will be available for his/her side of the connection. If the callee is simply "taking calls," the system might call the callee first, since he/she might be the more unlikely party to be available. Other communication paths include getting in line, joining a conference call, turning on a video connection, scheduling an appointment, entering into a chat session, etc.

Similarly, the golf pro can use the phone number for various offline media and other media. For example, if the golf pro writes a column for Golf Digest magazine, he can put the phone number that is assigned to him (e.g., Ether phone number) at the end of the column, such as 1-800-GO-ETHER, extension XXXX. The system can even provide him with a custom 800 number, such as 1-800-GOLF-PRO, rather than the extension to a generic 1-800-GO-ETHER number. For example, the column may include the following message: "Call me to talk about your own golf swing. Dial 1-800-GOLF-PRO. $100/hour." Alternatively, the Ether phone number can be a phone number local to a specific region of interest to the golf pro (e.g., having the same area code, or the same area code and exchange, as those in the target geographical area).

In one embodiment, the callee may request a phone number, such as "1-800-GO-ETHER" extension "YOU", which is specifically assigned to the callee (and/or the listing). The callee can publish the assigned phone number in the blog, home page, printed publications, brochure, or business card. The phone number may be given out during a TV or radio talk show, etc. When the assigned phone number is called, the call is first connected to a server of the system. The system can then call the callee and join the caller and the callee for real time communication.

Figure 3:
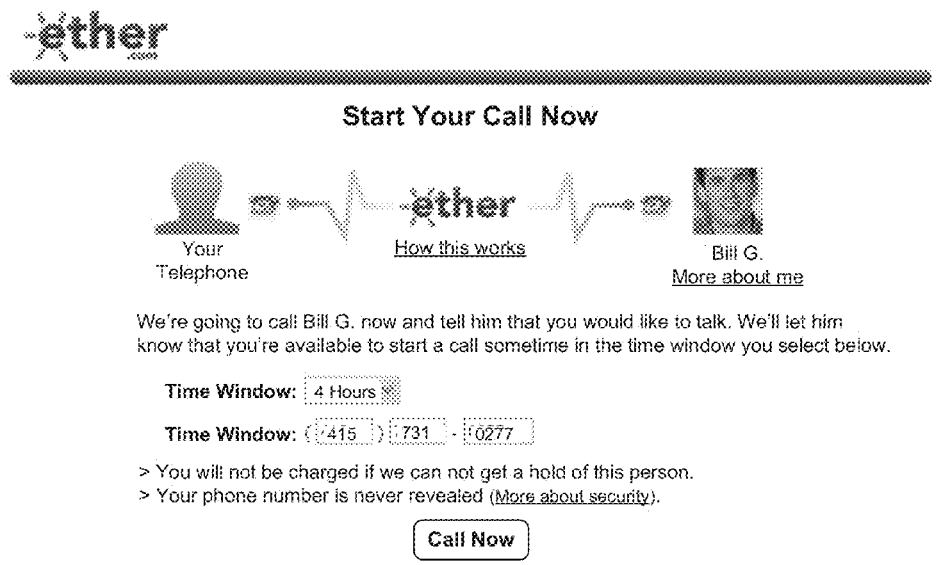
FIG. 3 illustrates a user interface to start a communication according to one embodiment.

FIG. 3 illustrates a user interface to start a communication according to one embodiment. For example, after a caller selects a call button, the user interface as illustrated in FIG. 3 is displayed (e.g., in the browser of the caller, or in a pop-up window).

In the example of FIG. 3, a call graphic is displayed to show the progress of making the connection. In FIG. 3, the photo of the callee (e.g., the photo uploaded by the callee to the server for the listing during the creation of the listing) is displayed with a link "More about me", which when selected causes the browser to display the description of the listing corresponding to the call button.

In one embodiment, when the photo of the listing is not available, the system may present a standard icon to represent the callee.

In FIG. 3, an icon and the description "Your Telephone" are displayed to present the caller. An "ether" icon between the caller and callee represents the system. The link "How this works" under the "ether" icon can be selected to see the details of the call process, which can be helpful to a user who is not familiar with the system.

The user interface presents an entry to receive a time window (e.g., 4 hours) within which the caller is available to take a call back from the system to talk to the callee. The user interface also includes an entry to receive the phone number of the caller such that the system can call back the caller to make the connection between the caller and the callee in this time window.

In one embodiment, the user interface can be part of the VoIP client application (e.g., the user interface of a VoIP terminal, such as the user interface of a VoIP-enable phone, or an application window of a VoIP application running on a computer or a Personal Digital Assistant (PDA)). The VoIP phone connection can be established, whether the user inputs the callback phone number or if the VoIP connection simply connects the two parties without the need of a phone number.

In FIG. 3, the user interface includes a button "call now" which when selected causes the user interface to send the time window and the callback phone number to a server to request for a phone connection.

In one embodiment, the user interface is part of the VoIP client application which can send the telephonic contact information (e.g., the phone number of the VoIP client application or a user ID of the VoIP system) to the server without the user explicitly specifying the call back number.

Figure 4:
FIG. 4 illustrates a user interface to display the status of a communication connection process and to provide the user guidance through the process according to one embodiment.

FIG. 4 illustrates a user interface to display the status of a communication connection process and to provide the user guidance through the process according to one embodiment.

In FIG. 4, the call graphic shows that the phone of the callee is off the hook, indicating that the callee has accepted the call. The call graphic shows the icon "Press 1" to instruct the caller to press "1" on the phone to be connected to the callee.

The user interface further provides text explaining the status and instruction to the caller.

In one embodiment, before the callee accepts the call, the system calls the callee, during which the call graphic shows that the phone of the callee is ringing and the phone of the caller is on the hook, not yet answered by the callee. The text is provided in the user interface to explain the current status of the connection process and to instruct the user to wait while the system is contacting the callee.

Thus, in one embodiment, the system provides the user-friendly, step-by-step feedback and instruction to the caller to guide the caller through the connection process.

In one embodiment, after the connection between the caller and callee is established, the system further provides feedback and instructions on the call graphic. For example, during the call the system can provide the accumulated call time for the purchased call. If the purchased call has a time limit, the call graphic can further show the remaining minutes of the call. When the time limit is approaching (or reached), the call graphic can provide the guidance and instructions for "recharge" (e.g., by purchasing a further package, or switching to a per minute mode with a further time limit, etc.). In one embodiment, the options to continue the call when the time limit is approaching (or reached) is displayed in the graphical user interface so that the caller may select an option in the graphical user interface without interrupting the conversation with the callee.

In one embodiment, if a purchased call with a time limit is interrupted/dropped before the time limit is reached, the caller can continue the call by requesting a re-connection with a time window. To help the caller, the call graphic can present the guidance and instructions for continue the call and present the status of the continuation of the call. For example, the call graphic may present a description of the continuation policy for interrupted/dropped call and show the remaining portion of the time window to resume the call.

One example scenario of using a call button that is placed in the blog, home page, or email of the callee (seller) is described below.

When the callee (seller) is taking calls, the call button of the callee (seller) says "Call Me."

When the caller (buyer) clicks on the button, the caller (buyer) is led to a landing page that explains how the service works and indicates the price, which might be $100 to talk on the phone for 60 minutes and $1 per minute thereafter.

When the caller (buyer) clicks the "Continue" button on the landing page, the caller (buyer) is brought to a page to specify payment options (e.g., credit card information). Or, if the caller (buyer) is a returning member, the caller (buyer) can sign in (e.g., through providing the correct member name and password) to instruct the system to use the billing information (e.g., credit card and billing address) that is already on file (e.g., that has been previously submitted to the system and that is stored in the database of the system in association with account of the caller). If the caller (buyer) is not a member, the caller (buyer) is presented with a page to register with the system and become a member. Alternatively, the caller (buyer) may specify the payment information without becoming a member.

For example, the page may identify the caller (buyer) as a member according to the information provided by a cookie maintained by the web browser of the caller (buyer). If the cookie exists, the cookie includes the member name of the caller (buyer). If the cookie indicates that the caller (buyer) has already signed in, the server may skip the sign-in process; otherwise, the caller (buyer) is prompt to sign in. If the caller (buyer) is new to the network, the caller (buyer) is asked to register and become a member.

In one embodiment, the call button/link does not bring the caller (buyer) inside the marketplace (e.g., a list showing competitors). Instead, the actions related to the call button happen in the environment of the callee (seller). For example, the web page(s) can be just a pop-up window so that the caller does not have to leave the web page (e.g., blog or home page) of the callee (seller). The landing page may be within a frame of the blog/home page of the callee, or within an applet embedded in the blog/home page of the callee.

Alternatively, the call button may bring the caller (buyer) to a VoIP application and provide the guidance and instruction to the caller on the user interface of the VoIP application.

In one embodiment, the VoIP application has browser functionality and shows the call button with the blog, web page or email in the user interface of the VoIP application.

Alternatively, the call button may bring the caller (buyer) to the marketplace which shows the offers of the competitors of the callee (seller).

In one embodiment, after confirming the payment information, the caller (buyer) is led to a page to specify the phone number that the caller (buyer) would like to be called back at and the time window within which the caller (buyer) is willing to receive the call back to talk to the callee (seller). The time window might be "four hours." FIG. 3 shows an example of such a page.

When the caller (buyer) continues (e.g., pressing the button "Call Now" in FIG. 3), the system obtains the authorization to charge an amount, when the call is connected (e.g., $100 from the buyer's credit card, if the credit card is the method of payment).

In one embodiment, a call for a package of bulk minutes (e.g., that has a specified time limit) is charged when the two parties are connected, regardless of whether the duration of the time limit is reached. In one embodiment, to avoid the difficulty in charging the buyer (e.g., $100) to talk to a seller but the seller fails to call back within the time window requested by the buyer, the system does not charge the buyer until after a connection between the caller (buyer) and the callee (seller) is successfully established (e.g., for a minimum period of time, or after the phone call is completed, or after the time limit is reached, etc.).

In one embodiment, the system "pre-authorizes" the charge (e.g., $100) on the buyer's credit card to make sure that, should the connection be completed, the buyer would be able to pay. In one embodiment, the system indicates the status of pre-authorization, charging/not-charging to the buyer in the user interface that guides the user through the process of making the connection.

Alternatively, the system may make the charge (e.g., $100) on the buyer's credit card when starting to make the connection and make a refund to the buyer if the connection is not successful within the call back time window specified by the caller (buyer). Alternatively, the system may charge a portion of the fee (e.g., $100) during the phone connection set up period, and refund the charge if the connection is not successful or charge the remaining portion after the connection is made successfully (e.g., after the phone call is completed).

In one embodiment, the system determines whether or not to pre-charge the buyer based on statistic data, such as the credit history of the caller (buyer), the success rate of the callee (seller) to call back within the time window specified by the caller (buyer), etc. Thus, for example, if the system determines that the call is likely to be established within the time window, the system may pre-charge the caller; for example, if the system determines that the caller (buyer) has a good credit history, the system may defer the charge to a later stage (e.g., after the completion of the call).

In one embodiment, after the system determines that the caller (buyer) has a sufficient source to pay for the call, the system calls the callee (seller) and says: "We have a caller who is calling you on your call button. He is paying your $100 fee and is willing to wait up to 4 hours to talk to you. Please press 1 on your telephone keypad if you want to take the call now; press 2 if you can't take it now but can indeed take it within the next 4 hours that has been requested, or press 3 if you won't be able to take it within 4 hours." Note that different system may associate different sets of key pressing events (e.g., press 1, press 2, press 3, . . . ) with different options.

In one embodiment, the system can optionally provide the callee (seller) with more information about the caller (buyer) based on pre-recorded information. For example, the system can record the self introduction of the caller (buyer) (e.g., the name of the caller, for instance 'Bob') so that the system tells the callee "We have 'Bob' . . . " instead of "We have a caller . . . ", where 'Bob' is the recording of the self-introduction of the callee (buyer).

In one embodiment, the system has the name of caller (buyer) recorded as part of the member preference/attribute of the caller (buyer). Alternatively, the system can use a text-to-speech program to "read out" the name of the buyer when introducing the call to the callee (seller). Alternatively, the system can record the name of the caller (buyer) when the system receives a call from the caller at the phone number assigned to the callee, or callback the caller first to obtain the recording.

In one embodiment, if the callee (seller) presses 1, the system tells the callee (seller) to hold on while the system calls the caller (buyer). The screen of the caller (buyer) is updated automatically to indicate that the callee (seller) is ready and the caller (buyer) is being called back for the connection between the caller (buyer) and the callee (seller).

If the callee (seller) presses 2, the system tells the caller (buyer) (e.g., on the screen of the caller) that the callee (seller) can't take the call now but expect to take the call within an identified period of time (e.g., the next 4 hours). The system will arrange to make the phone connection within the identified period of time (e.g., the next 4 hours).

In one embodiment, the system may use alternative numbers to indicate a response of the callee.

For example, the system may send a message (e.g., through email, a web-based user interface for the callee (seller), a voice mail, an instant message, etc) to the callee about the call and the identified period of time (e.g., 4-hour time window) so that the callee (seller) may indicate to the system within the identified period of time (e.g., next 4 hours) that the callee (seller) is ready for the call.

Alternatively, the system may try to call the callee (seller) periodically or according to a time period specified by the callee (seller). For example, the callee may press 15 after pressing 2 to indicate that system should try to make the connection after 15 minutes. Alternatively, the callee may provide such an indication through replying to the email, instant message, short text message, or through a network-based user interface (e.g., web-based) that is designed to manage the user account. For example, the network-based user interface may present a list of calls in the queue and the corresponding time windows. When ready to take the next phone call, the callee can indicate to the system that the callee is currently available to take a call (or a particular one of the calls in the list).

Alternatively, the caller (buyer) may try to call the callee (seller) again within the time window (e.g., next 4 hours).

In one embodiment, the system may monitor the activities related to this call to avoid duplicated efforts in making the connection within the time window (e.g., next 4 hours) so that the caller and callee are not interrupted by unnecessary attempts to make the connection.

If the callee (seller) presses 3, the system tells the caller (buyer) that the callee (seller) can't take the call within the requested time window. The caller (buyer) in this case is not charged the price (e.g., $100). In one embodiment, the caller (buyer) is charged the price (e.g., $100) only when the call between the caller (buyer) and callee (seller) is actually connected.

When the system makes the connection between the caller (buyer) and callee (seller), the system may call the caller (buyer) first or call the callee (seller) first, or call both at about the same time. For example, the system may determine which one of the caller and callee is more reliable and call the reliable one of the two first. The system may determine which of the parties is more reliable based on statistic data collected from past call connection activities. Alternatively, the system may connect to the less reliable party first. Alternatively, the callee (seller) may specify the preference of who is to be called first as part of the specification of the listing.

When the caller (buyer) calls the phone number assigned to the callee (assignee) (e.g., 800-GO-ETHER extension 4567), the system may first authenticate the caller and/or arrange the payment options and then prompt the caller to enter the time window and the call back phone number using the key pad of the phone. An interactive voice response (IVR) system can be used to interact with the caller so that the caller does not need web access to be connected to the callee (seller).

Alternatively, the system may determine automatically the telephone contact information of the caller from the call received from the caller (buyer) (e.g., through call ID service or an Automatic Number Identification (ANI) service) and use the telephone contact information in calling back. The system may present an option for the caller (buyer) to confirm the automatically detected telephone contact information of the caller for calling back so that the caller has an opportunity to specify different telephone contact information for the call back.

In one embodiment, when the system determines that the caller has a graphical user interface (e.g., web access) while requesting the connection for the call (e.g., when the caller pushes a button on a web interface to request the call, or when the caller is signed into the system or when the online presence of the caller is detected, or when the call is initiated from a VoIP terminal that has a graphics capability), the system uses the graphical user interface to assist the caller. When the system fails to detect the online presence of the caller, the system uses the IVR system to provide the caller (buyer) with guidance. Thus, the system automatically switches between using the web interface to guide the caller or using the IVR interface to guide the caller.

In one embodiment, the system may further use other communication systems to guide the callee (e.g., according to the presence and availability of such communication systems). For example, the interface may be Wireless Application Protocol based (WAP-based) applications, or based on instant messaging, or based on a custom designed client-server application/protocol. Thus, a web-based interface is presented as an example. User interfaces based on other communication protocols and/or other types of communication systems can also be used.

In one embodiment, the system may ask the caller (buyer) to hang up temporarily until the callee accepts the call. Alternatively, the system may allow the caller (buyer) to stay on the line while the system attempts to reach the callee (seller).

In one embodiment, the system allows the callee (seller) to specify one or more alternative phone numbers in case the callee (seller) is not reachable at the primary phone number specified for the listing. Similarly, the caller (buyer) may also specify one or more alternative call back phone numbers. In one embodiment, the system allows the parties to specify other telephonic references (e.g., user names of Internet telephonic application) to make the telephone connection. In one embodiment, the system may further allow the user to specify other identities to make connections for other types of real time communications, such as chat, instant messaging, video conferencing, etc.

In one embodiment, the system arranges the call according to aspects of the methods described in the U.S. Patent Application Publication No. 2004/0252820 (application Ser. No. 10/360,776, filed on Jun. 12, 2003), which is hereby incorporated herein by reference.

When the caller (buyer) requests the connection using the call button, the web server provides the instructions and feedback to guide the caller (buyer) through the call process.

When the caller (buyer) dials the callee's listing via the Ether phone number (e.g., the 800 number assigned to the callee), an interactive voice response (IVR) system is used to provide similar instructions and feedback to guide the caller (buyer) through the call process.

For example, the caller (buyer) registers and creates an identity using the phone number and a PIN. A credit card is asked for via IVR or live operator to set up payment options. Then the call window is entered on the keypad of the phone, such as pressing the string of keys "4*" to indicate a "4" hours window or "60#" for a "60" minutes window.

In one embodiment, when the callee is having a telephonic connection with the system, the system prompts the caller (buyer) to utter a message for the callee (seller). For example, the caller (buyer) may say "I'm Bob Stanley—remember we met at the golf conference last weekend." The system records the messages of the caller (buyer). When the callee (seller) gets the call, the system says, "There's a buyer on the line who's paid $100 and is willing to wait 4 hours and here's how he identifies himself: 'I'm Bob Stanley—remember we met at the golf conference last weekend.'" The system in such a way provides as much identifying information to the callee (seller) as possible so that the callee (seller) may screen the callers for acceptance. In one embodiment, the system behaves as an automatic secretary, screening who's on the line for the callee (seller).

In one embodiment, the system provides functionality for bulk-minute pricing.

For example, once a call starts, the system metes out the time that has been bought. When the time limit, for example, 60 minutes, is up, the system tells both parties on the phone that the time is up. The system then prompts the buyer to add more money to buy a second package, or go to per minute pricing, or end the call, or let them talk further for free, according to the continuation policy of the call which is specified by the callee (seller) in the listing (e.g., specified during the creation of the listing).

In one embodiment, if the parties hang up after just, for example, 35, minutes of a 60-minute call, the system has a time window in which it expires the remaining minutes. The time window can be set quite large, such as a year, so that someone can buy a 1,000-minute discount package and talk 100 times over the course of the year. Or the time window can be set small, such as 30 minutes, in which case the caller (buyers) can call again within the 30-minute window after the 35-minute call to keep talking based on the already purchased 60-minute package, but the caller (buyers) can be connected on the basis of the unused portion of the 60-minute call package after a break that is longer than the time window.

In one embodiment, the system time window specifies the longest period of break before the unused portion of the purchased package expires.

In one embodiment, the system time window specifies the period from the starting of the conversation and the time when the purchased package expires. For example, the system may specify a window of 4 hours or so by default, so that people who get cut off or interrupted can finish their calls in this window of time.

In one embodiment, the system time window is based on the size of the purchased package. The larger the time limit of the package, the larger is the time window. In one embodiment, the expiration of the package is based on a limit on the separate calls (e.g., three). In one embodiment, the expiration of the package is based on the expiration time window and the limit on separate calls, whichever is reached first.

In one embodiment, the system allows the callee (seller) to specify the expiration time window in the specification of the listing (e.g., as part of the continuation policy of the call package) and/or the limit on the separate calls.

FIGS. 5-12 show examples of flow diagrams of a process to connect a user and an adviser for telephonic conversation according to one embodiment.

In one embodiment, when a caller selects (e.g., clicks) on a call button according to one embodiment, the selection (e.g., click) leads down several different paths depending on the availability status of the seller.

Figure 5:
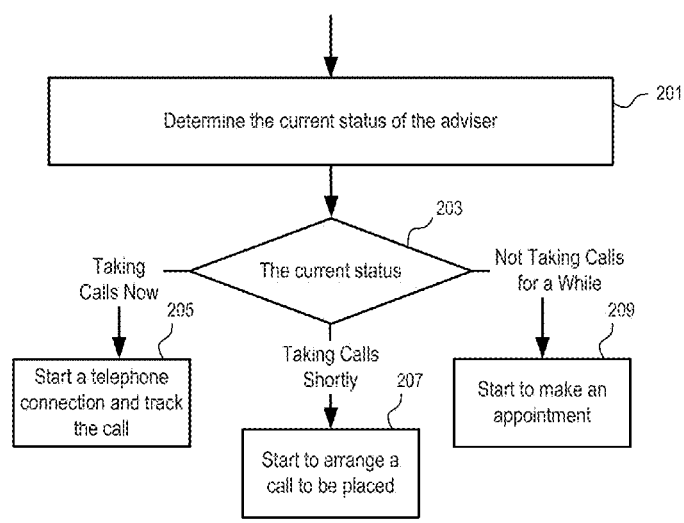
FIGS. 5-12 show examples of flow diagrams of a process to connect a user and an adviser for communication according to one embodiment.

For example, in FIG. 5, the system determines (201) the current status of the adviser at the time the telephonic connection is started. In one embodiment, the current status of the adviser is determined based at least partially on the information provided by the adviser. For example, the adviser can specify the scheduled hours of the day during which the adviser is expected to take calls; the adviser may select a button (e.g., push through placing a cursor over the button on a display of a graphical user interface and activating a selecting device, such as a key or a button of a cursor positioning device such as a mouse or a touch pad or a joystick, etc.) on a web page, or make a phone call to the system, to indicate whether the adviser is currently busy and not answering new calls and/or to further specify the estimated duration of the busy period. The adviser may select a button on a user interface (e.g., a web page designed for the management of the listing and/or account of the adviser) to indicate that the adviser is now free and ready to take calls. The adviser may pick up the phone call from the system and indicate to the system the current status of the adviser. The adviser may transmit the current status information to the system using instant messages, email, SMS messages, etc.

If the current status (203) of the adviser is "Taking Calls Now" or something equivalent, the system starts (e.g., immediately) a telephone connection and tracks the call (205).

If the current status (203) of the adviser is "Taking Calls Shortly", the system starts (207) to arrange the call to be placed within the time period specified by the caller without trying to call the adviser immediately, since the adviser is temporary busy and will be available to take calls within a short period of time.

If the current status (203) of the adviser is "Not Taking Calls for a While" or something equivalent, the system starts (209) to make an appointment for the user to call the adviser, since the adviser is not available to take the call and will not be available for a longer period of time.

Figure 6:
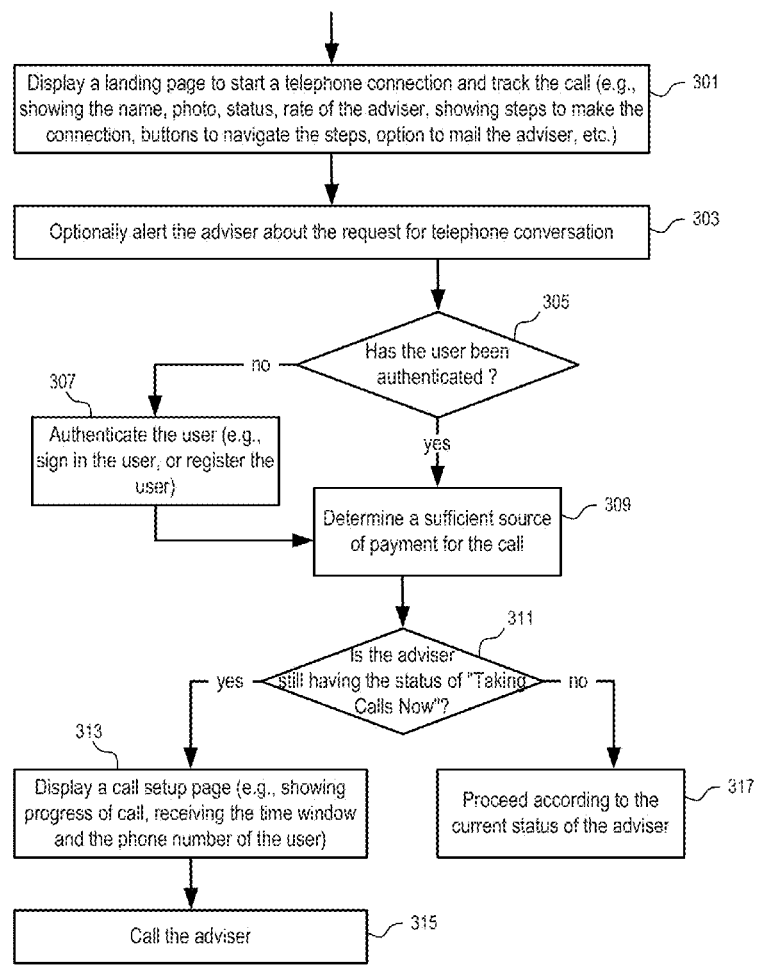

In FIG. 6, when the system starts to at least initiate a telephone connection (e.g., in response to a request from a selected call button), the system displays (301) a landing page to at least initiate a telephone connection and track the call. For example, the web server of the system transmits information defining the landing page to the web browser of the user to show the landing page (e.g., in a pop-up window).

For example, the landing page may show the name, photo, status, rate of the adviser, show/explain the process to make the connection, buttons to navigate the process, option to mail the adviser, etc.

Optionally, the system alerts (303) the adviser about the request for telephone conversation (e.g., through a web-based user interface, or through email, instant messaging, short text message, etc.)

The system determines whether the user has been authenticated (305). If the user has not been authenticated, the system authenticates (307) the user. For example, the system signs in the user if the user is already a member, or registers the user as a new member if the user is not yet a member.

The system then determines (309) a source of payment for the call.

After the system has identified a source of payment for the call based on the price for the call specified by the adviser in the listing, the system may further determine if the adviser is still having the status of "Taking Calls Now". In certain instances, the process of authenticating the user and securing the source of payment may take an extended period of time such that the availability status of the adviser may have changed.

If the adviser is no longer available for immediate connection, the system proceeds (317) according to the current status of the adviser, based on whether the current status is "Taking Calls Shortly" or "Not Taking Calls for a While".

If the adviser is still available for immediate connection, the system displays (313) a call setup page. The call setup page may show the progress of call and user interface elements to receive the time window and the phone number of the user (caller).

Once the time window within which the user (caller) is available for the call and the call back phone number of the user is received, the system calls (315) the adviser.

Figure 7:
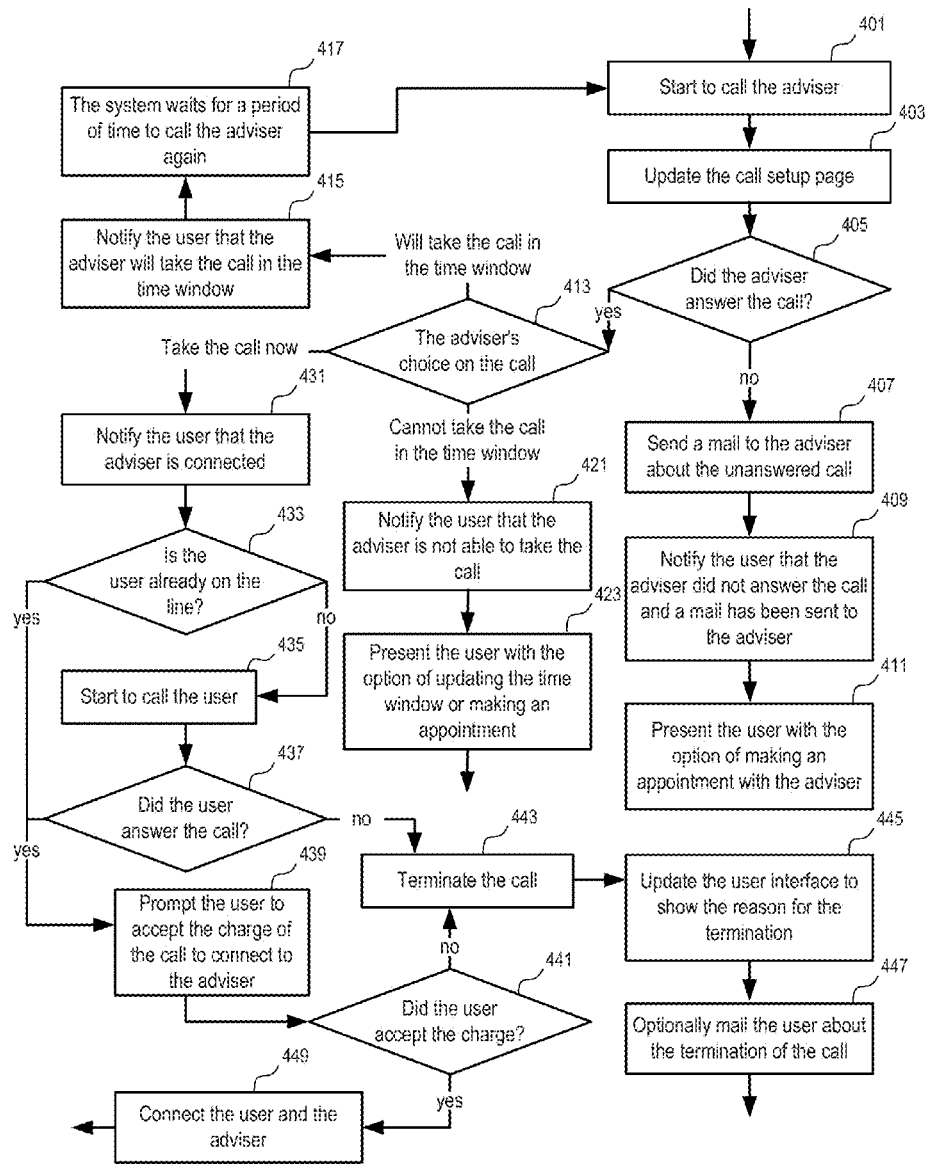

In FIG. 7, after the system starts (401) to call the adviser, the system updates (403) the call setup page. For example, the system may play an animation and/or sound clip and/or a text message to indicate that the system is calling the adviser, in one embodiment.

Then, the system determines whether or not the adviser answered the call (405).

If the adviser failed to answer the call, the system sends (407) a mail to the adviser about the unanswered call. The system notifies (409) the user that the adviser did not answer the call and a mail has been sent to the adviser. The system then presents (411) the user with the option of making an appointment with the adviser.

If the adviser answered the call, the system obtains the adviser's choice (413) on the call.

The adviser may indicate that the adviser will take the call in the time window specified by the caller, in which case, the system notifies (415) the user that the adviser will take the call in the time window. Then, the system waits (417) for a period of time to call the adviser again. Alternatively, the system may try the connection based on an indication from the adviser that the adviser is ready to take the call (e.g., by calling the system, selecting a button or a link on a web page in the account of the adviser, sending an email/instant message/short text message to the system or replying to a message from the system about the call, etc.)

The adviser may indicate that the adviser cannot take the call in the time window specified by the caller, in which case, the system notifies (421) the user (caller) that the adviser is not able to take the call and presents (423) the user with the options of updating the time window and making an appointment.

The adviser may indicate that the adviser wants to take the call now, in which case, the system notifies (421) the user that the adviser is connected and the server is now calling the user (at which point of the process, the caller may or may not one the phone). The system then determines if the user is already on the line (433).

If the user is not already on the line, the system starts (435) to call the user and determines whether the user answered the call (437).

If the user did not answer the call back, the system terminates (443) the call (443) and the adviser is notified.

After the user answers the call back, the user is on one line and the adviser on another line. The system then prompts (439) the user to accept the charge of the call before connection to the adviser and determines whether the user accepts the charge (441).

If the user accepts the charge, the system connects (449) the user to the adviser (e.g., by joining the calls) and starts to monitor aspects of the call (e.g., duration) and charge the user.

If the user rejects the charge or fails to provide a response within a predetermined period of time, the system terminates (443) call. After the termination of the call, the system updates (445) the user interface to show the reason for the termination. Optionally, the system mails (447) the user about the termination of the call.

Figure 8:
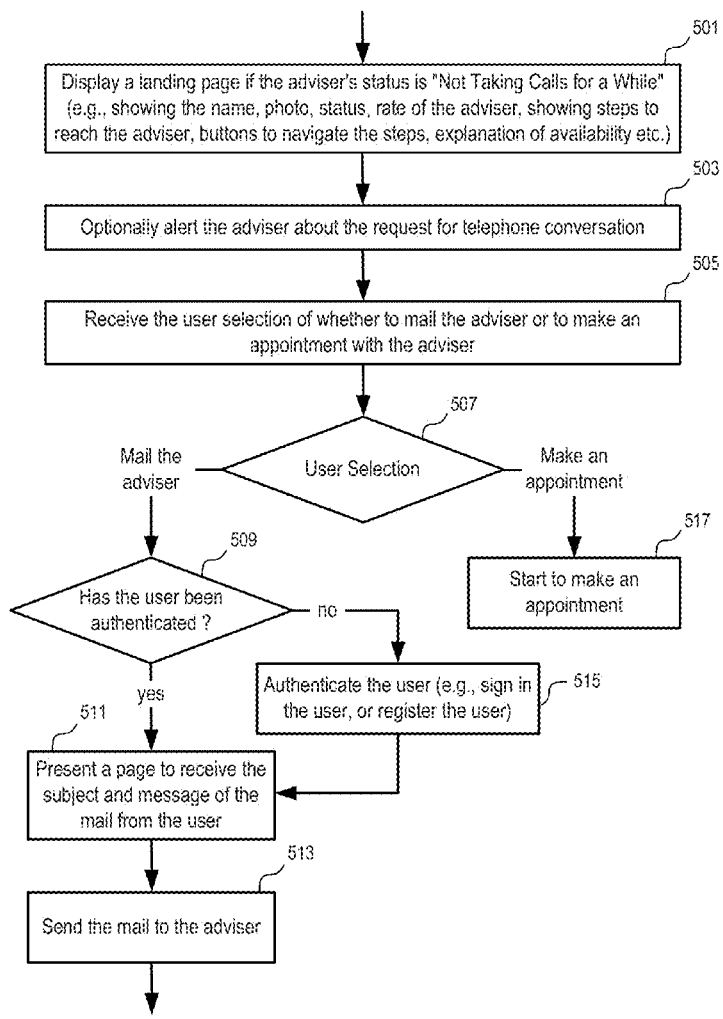

In FIG. 8, the system displays (501) a landing page, if the adviser's status is "Not Taking Calls for a While". The landing page may show the name, photo, status, rate of the adviser, and show the process to reach the adviser, buttons to navigate the process, explanation of availability, etc.

Optionally, the system alerts (503) the adviser about the request for telephone conversation.

In one embodiment, the system receives (505) from the landing page the user selection whether to mail (e.g., email or use other types of messaging systems) the adviser or to make an appointment with the adviser.

If the user selection (507) is to mail the adviser, the system determines if the user has been authenticated (509). If the user has not been authenticated, the system authenticates (515) the user. For example, if there is no cookie in the web browser of the user indicating that the user is currently in a valid session, the user may be presented with an interface to sign in or to register.

If the authenticated user chooses to mail the adviser, the system presents (511) a page to receive the subject and message of the mail from the user. After receiving the subject and message of the mail, the system sends (513) the mail to the adviser (without showing the mailing address of the adviser to the user and without showing the mailing address of the user to the adviser) in accordance with one embodiment.

In one embodiment, the mail is delivered electronically (e.g., through an email, instant message, SMS message, web mail). Alternatively, the mail may be delivered as voice mail, print out, etc.

If the user selection (507) is to make an appointment, the system starts (517) to make an appointment.

Figure 9:
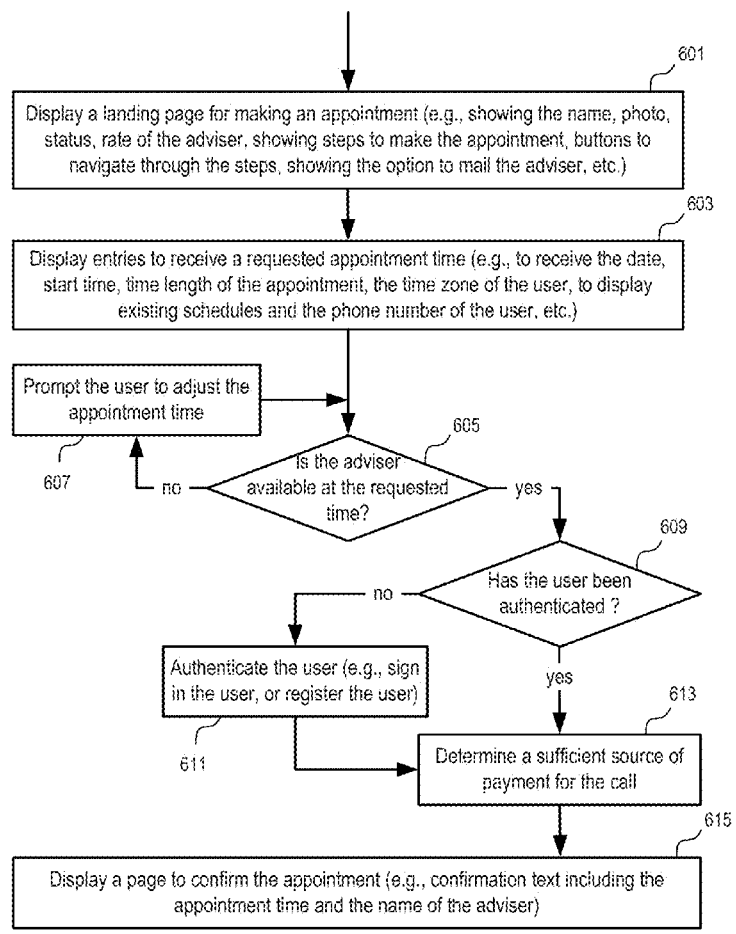

In FIG. 9, the system displays (601) a landing page for making an appointment. The landing page may display one or more of the name, photo, status, rate of the adviser, and show stages of operations to make the appointment, buttons to navigate through the stages of operations, show the option to mail the adviser, etc.

The system displays (603) entries to receive a requested appointment time. The entries can be part of the landing page or a page displayed after a navigation button is selected. In one embodiment, the entries are used to receive one or more of the date, start time, time length of the appointment, the time zone of the user, etc.

In one embodiment, the system further displays existing schedules and the phone number of the user, etc. for the convenience of the user (e.g., if the user is already authenticated at this point of the process).

After the requested time of the appointment is received from the user, the system determines if the adviser is available at the requested time (605). If the adviser is not available at the requested time, the system prompts (607) the user to adjust the appointment time; otherwise, the system proceeds to the task of filtering the callers.

If the system determines that the user has not been authenticated (609), the system authenticates (611) the user through signing in the user or registering the user. The system then determines (613) if a sufficient source of payment for the call is available from the user.

If there is a sufficient source of payment for the call, the system accepts the appointment and displays (615) a page to confirm the appointment. The confirmation page may show confirmation text including the appointment time and the name of the adviser.

In one embodiment, after the appointment is made, the system automatically starts to make connections to the caller and the callee separately at the requested time of the appointment. Alternatively, the system may reserve a time slot on the schedule of the callee on behalf of the caller and request the caller to make a request for a connection at the scheduled time. Alternatively, the system may request the adviser (callee) to make the request for the connection. For example, the system may determine a less reliable one of the two to make a request for the connection, or contacting the less reliable one first, during the appointment time is reached before starting to contact the other party.

Figure 10:
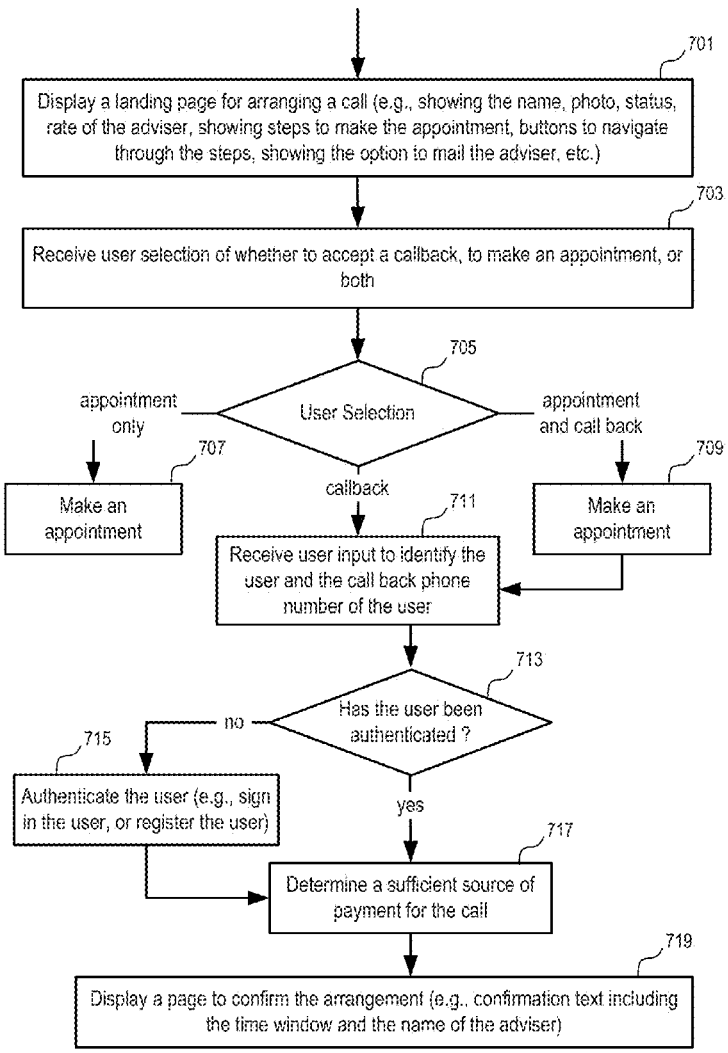

In FIG. 10, the system displays (601) a landing page for arranging a call. The landing page may display one or more of the name, photo, status, rate of the adviser, show stages of operations to make the appointment, buttons to navigate through the stages, show the option to mail the adviser.

The system receives (703) a user selection of whether to accept a callback, to make an appointment, or both.

If the user selection includes making an appointment, operation 707 or operation 709 is performed to set up an appointment (e.g., according to the process illustrated in FIG. 9).

If the user selection includes accepting a callback, the system receives (711) user input to identify the user and the call back phone number of the user and determines whether the user has been authenticated (713). If the user has not yet been authenticated, the system authenticates (715) the user (e.g., through signing in the user or registering the user).

After the user is authenticated, the system determines (717) if a sufficient source of payment for the call is available (e.g., to filter out non-serious callers). The system then displays a page to confirm the arrangement (e.g., confirmation text including the time window and the name of the adviser).

Figure 11:
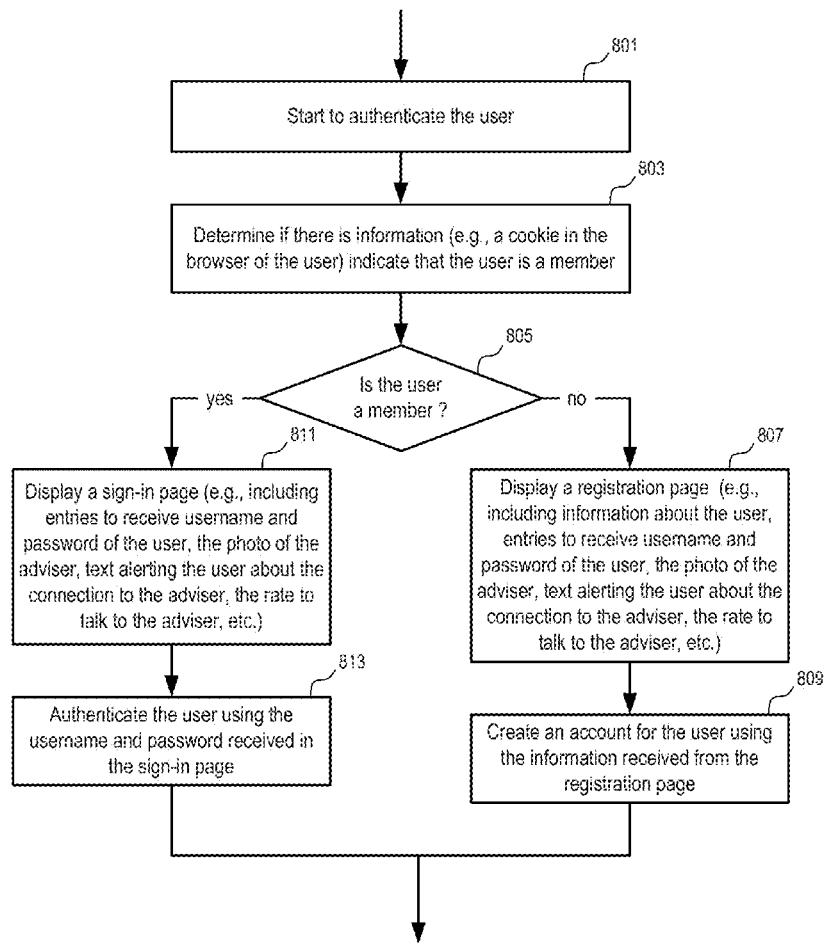

FIG. 11 shows an example to authenticate the user. In FIG. 11, after the system starts (801) to authenticate the user, the system determines (803) if there is information to indicate that the user is a member. The information may be in a cookie in the browser of the user, or a parameter encoded in an URL (universal resource locator) of a link, or a parameter in an applet running in the web browser.

If the user is a member (805), the system displays (811) a sign-in page which may include entries to receive a username and a password from the user. In one embodiment, the sign-in page may optionally further include the photo of the adviser, text alerting the user about the connection to the adviser, the rate to talk to the adviser, etc. Thus, the sign-in appears to be in the environment of the adviser. The system then authenticates (813) the user using the username and password received in the sign-in page.

If the user is not a member (805), the system displays (807) a registration page. The registration page may include information already collected about the user (e.g., during the interaction before the registration) for confirmation purpose. The registration page includes entries to receive username and password of the user. In one embodiment, the registration page may optionally further include the photo of the adviser, text alerting the user about the connection to the adviser, the rate to talk to the adviser, etc. Thus, the registration appears to be in the environment of the adviser. The system then creates (809) an account for the user using the information received from the registration page.

In one embodiment, after the user is authenticated, information is created to indicate that the user is authenticated for a valid session (e.g., using a cookie, a parameter in URL or in an applet) until the session expires or the user signs off.

Figure 12:
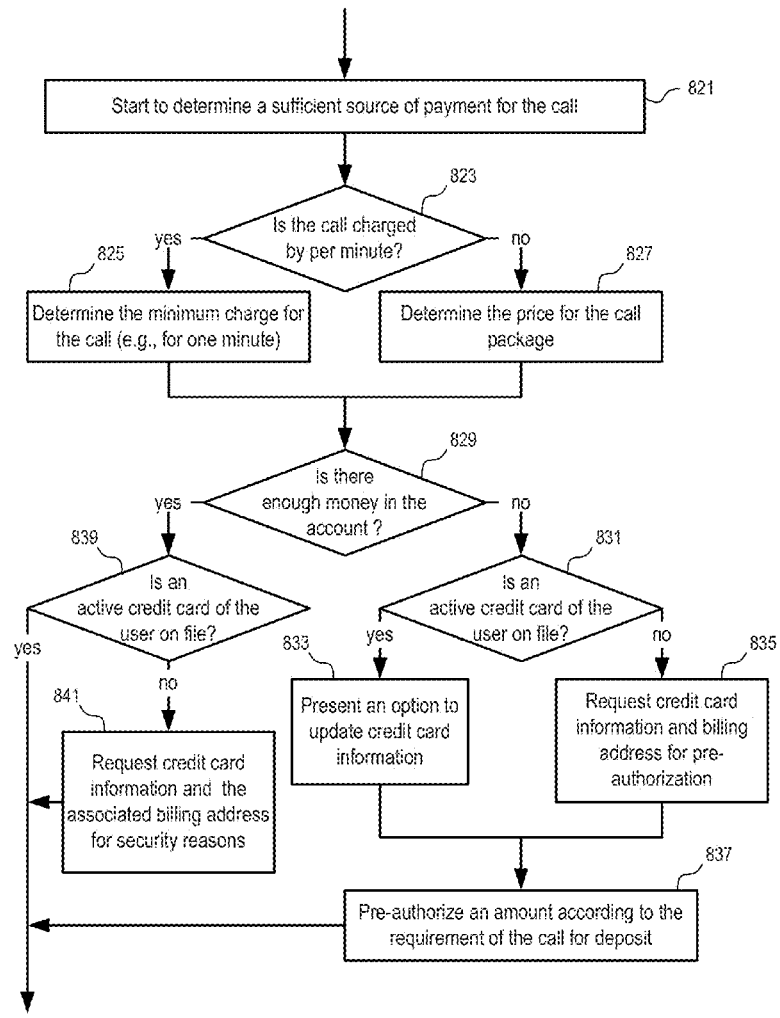

FIG. 12 shows an example to determine if a sufficient source of payment of the call is available.

After the system starts (821) to determine if a sufficient source of payment for the call is available, the system determines (823) whether the call is charged by per interval (e.g., per minute). If the call is charged by per interval, the system determines (825) the minimum charge for the call (e.g., for one minute). If the call is not charged by per interval, the system determines (827) the price for a call package (e.g., $100 for 1 hour, as specified by the adviser).

The system then determines whether there is enough money in the account of the user (829) and/or whether there is an active credit card of the user is on file (839 and 831).

If the account of the user has enough money for the call and/or an active credit card of the user is not on file, the system optionally requests (841) for the credit card information and the associated billing address for security reason.

If the account of the user does not have enough money for the call, the system will pre-authorize (837) an amount according the requirement of the call for deposit purpose. If an active credit card of the user is on file, the system optionally presents (833) an option to update the credit card information. If no active credit card of the user is on file, the system requests (835) credit card information and billing address for pre-authorization.

In one embodiment, when information identifying the user is available (e.g., through a "cookie" implemented in the web browser or parameters encoded in the URL, or parameters stored in the variables of an applet running in the web browser, etc.), the system uses the information about the user to help the user. For example, from the member information database, the system may retrieve the phone numbers of the user. If there are multiple phone numbers for the user, a combo box is displayed for the user to select one from the known phone numbers of the user (or to type in a different one). If there is only one known phone number of the user, the system may display the known phone number of the user in an entry box as the default value.

If a user as identified by the information (e.g., cookie) is different from the current user, the current user can choose to edit the information and/or sign in as a different user.

In one embodiment, a user can enter the input information to set up a call, such as the call window and/or the callback phone number before the user is authenticated. When the user is subsequently authenticated (e.g., through signing in as an existing member or registering as a new member), the information provided by the user before the authentication process is used to update the account information (if changed).

Figure 13:
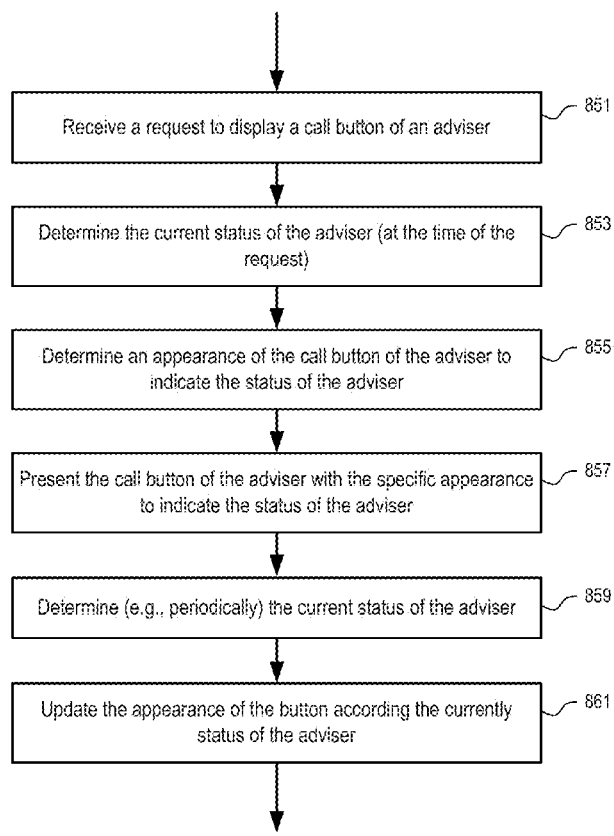
FIG. 13 illustrates a method to display a call button according to one embodiment.

FIG. 13 illustrates a method to display a call button according to one embodiment.

In one embodiment, the appearance of a call button is displayed according to the current availability status of the adviser to take the call.

For example, in FIG. 13, when the system receives (851) a request to display a call button of an adviser, the system determines (853) the current status of the adviser (at the time of the request). After the system determines (855) an appearance of the call button of the adviser to indicate the status of the adviser, the system presents (857) the call button of the adviser with the appearance to indicate the status of the adviser.

In one embodiment, the system further determines (859) (e.g., periodically) the current status of the adviser to update (861) the appearance of the button according the currently status of the adviser.

For example, the call button to be inserted in the blog of the callee can include an image at a URL on a server computer. When being requested the URL causes the server computer to determine a response based on the parameters encoded in the URL. For example, the URL can be pointing to a CGI (Common Gateway Interface) program which provides or generates the image according to the current status of the adviser. The URL may include a parameter to identify the adviser and/or the advertisement.

For example, when the current status of the adviser is "Taking Calls Now", the call button may show a telephone with text "Call Now"; when the current status of the adviser is "Taking Calls Shortly", the call button may show an off-hook telephone with text "Arrange a Call"; when the current status of the adviser is "Not Taking Calls for a While", the call button may show a telephone and a calendar with text "Appointment".

In one embodiment, different types of availability status of a callee (adviser) includes: on call, off call, busy, get in line, schedule an appointment, join conference, etc. It is understood that different systems may implement more or less types of availability status of a callee. Further, the call button may include other current status information about the callee, such as price, how many people are in line to call the callee, the schedule of the callee, and/or others.

In one embodiment, the call button is implemented using an applet running in the browser of the user. The applet displays the call button according to the current status of the adviser and checks the status of the adviser periodically to update the appearance of the button. In one embodiment, when an estimated time until which the adviser can take the call is available (e.g., received in the system from the adviser when the system attempts to contact the adviser, or provided by the adviser when the adviser is talking to a different user, etc.), the call button also shows an indication of such an estimated time to help the user in selecting a time window.

Alternatively, the call button may be implemented in custom applications (e.g., as plug-in to web browsers, email clients, etc., or as stand-along applications). The call button may communicate with the server using a special purpose protocol.

In one embodiment, a web/email (document) authoring tool is designed to automatically detect the phone number of the callee in a web page/email/document. The authoring tool can be set up to replace the phone number of the callee with the corresponding call button assigned to the callee and/or the phone number (e.g., ether phone number) that is assigned to the callee. For example, the authoring tool can detect the occurrence of the phone number of the callee in the document and prompt the user of the authoring tool to replace the phone number of the callee with the call button and/or the phone number assigned by the system. If the user accepts the suggestion, the authoring tool automatically replace the phone number of the callee with the call button and/or the phone number assigned by the system.

Figure 14:
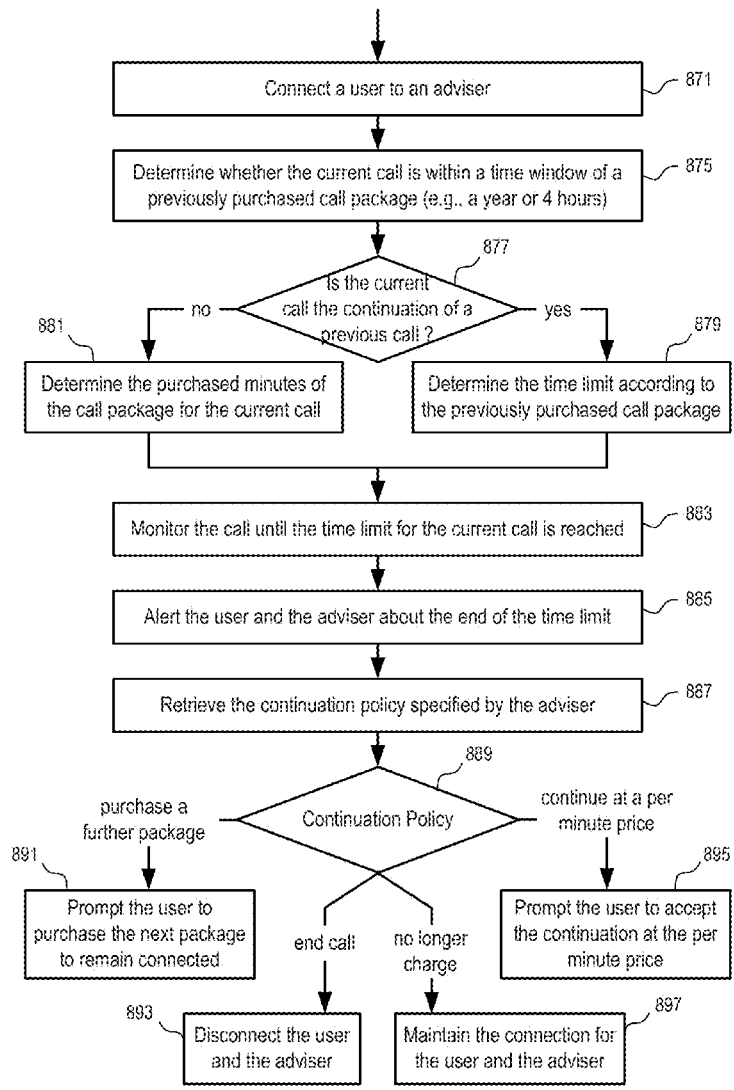
FIG. 14 illustrates a method to monitor and control a connection according to one embodiment.

FIG. 14 illustrates a method to monitor and control a connection according to one embodiment.

In FIG. 14, after the system connects (871) a user to an adviser, the system determines (875) whether the current call is within a time window of a previously purchased call package (e.g., a year or 4 hours).

In one embodiment, a call is considered a continuation of the previously purchased call package if the current call is within the time window. Thus, if the call of a previously purchased call package is interrupted, the user can continue the call within the time window without having to purchase another package.

Based on whether or not the current call is the continuation of a previous call (877), the system determines (879) the time limit according to the previously purchased call package, or determines (881) the purchased minutes of the call package for the current call. The system then monitors (883) the call until the time limit for the current call is reached. When the time limit for the call is reached, the system alerts (885) the user and the adviser about the end of the time limit.

In one embodiment, the continuation policy specified by the adviser is retrieved (887) to process the call at the end of the time limit.

If the continuation policy (889) is "purchase a further package", the system prompts (891) the user to purchase the next package to remain connected. For example, the user may be offered to continue the call at the price of $50 for another 30 minutes.

If the continuation policy (889) is "continue at a per minute price", the system prompts (895) the user to accept the continuation at the per minute price.

If the continuation policy (889) is "no longer charge", the system maintains (897) the connection for the user and the adviser until at least one of the user and the adviser hangs up.

If the continuation policy (889) is "end call", the system disconnects (893) the user and the adviser after altering the user and the adviser.

In one embodiment, the system stores a replication of the policy of the package the user purchased with the records of the purchased call (e.g., the policy at the time the call button is selected for the call package, or at the time the user is first connected to the adviser for the call package, or at the time the user explicitly confirms the purchase of the call package, etc.). Thus, the adviser is free to change the listing for the future callers even before the users finish the purchased call packages without retroactively affecting the purchased calls.

Some of the above examples are in the context of telephonic conversations. From this description, it will be understood that the techniques for connecting people for real time communications can also be applied to other types of communications, such as video and other multimedia channels, chat, instant messaging, document sharing, or screen-sharing, common "whiteboarding," interactive TV or internet TV, etc. Each of different multimedia channels can have different prices or be inclusive in one price (e.g., the use of part or all of the different channels can be included in the same price).

The real time communication may be on a one-to-one basis (e.g., one caller connected to one callee). The real time communication can also be in the form of one-to-many. For example, the seller may be hosting a conference in which multiple callers may attend. For example, 100 people can be in the same call or the same video session provided by the same seller.

Further, in one embodiment, the real time communication may include access to recorded sessions (e.g., recorded audio content and/or recorded video content).

Thus, the system on the whole may be used as a filter for sellers (callees), only letting in calls from people who are serious—they're serious because they have entered their credit card and are willing to pay. Celebrities can use the system. For example, people want to talk to the Oakland A's from the 70's, who are sitting on their porches these days. For example, Hollywood executives can use the system to hear pitches from scriptwriters who are willing to pay $1000 for the chance to pitch their script.

In one embodiment, these call buttons and the Ether phone numbers go to where the action is happening. In at least one embodiment, it is recognized that not all service commerce will happen through marketplaces, such as keen.com or a search engine. People who want to talk to the Oakland A's players are more likely the visitor of the web site www.oaklandathletics.com—and that's where the call buttons can be very effective. And the Ether phone numbers can be in magazines, underneath photographs, in newspapers, on business cards, etc.

In one embodiment, the current status of the callee (e.g., availability, schedule, etc.) and guidance and instructions for the phone connection are provided through the appearance of the call button and the content of the call graphic. Alternatively or in combination, the status information, guidance and instructions can also be presented based using an interactive voice response (IVR) system.

For example, a talk radio station may have a guest on every day at a noon talk show. After the one-hour show, the radio announcer may say, "The time is up on our show. We've enjoyed talking with Dr. Webber and answering your calls. If you'd like to talk further with Dr. Webber, go to our website at WKBR.com and set up a conversation with him. Or, just dial the number 1-800-TALK-KBR and get in line. It's just $29 per 10-minute conversation."

In this example scenario, the phone number 1-800-TALK-KBR is assigned to Dr. Webber, which can be used to achieve many of the same goals as the call button assigned to Dr. Webber. While the button can visually communicate to the user the current (e.g., real-time) availability of the callee, the price, how many people are in line already, the schedule of the callee, etc., telephony prompts on a interactive voice response (IVR) system can also be used to provide such information after the caller dials the phone number that is assigned to the callee.

For example, in one embodiment, after a caller dials the phone number 1-800-TALK-KBR, the call is connected to a server, which determines that the call is for Dr. Webber since the phone number 1-800-TALK-KBR is assigned to (associated with) Dr. Webber. The server can then determine the current status of Dr. Webber, including the availability status, the price for the package, etc., and provide the information to the caller through the IVR system. In one embodiment, the server prompts options according to the current availability status of Dr. Webber. For example, the server may offer an immediate connection when Dr. Webber is available for immediate talk, or an opportunity to input a callback time window and/or callback phone number when Dr. Webber is expected to be available in a short period of time, or an opportunity to schedule an appointment with Dr. Webber when Dr. Webber is not expected to be available in a short period of time, etc. The server may use the IVR system to inform the caller the current status of the connection process and to provide instructions to the caller to take actions, such as providing a callback time window, providing an appointment time, providing an indication to accept the price of the call package, etc.

In one embodiment, the status information, instruction and guidance are provided using a combination of graphical presentations (e.g., over a graphical user interface terminal) and voice prompts (e.g., through an IVR system).

In one embodiment, the callee (seller) charges the caller(s) for the real time communication. The system provides the service to arrange and connect the call. The system can collect the payment from the caller(s), deduct a portion of the payment as fees to provide the service, and deliver the remaining payment to the callee (seller).

Alternatively, the callers may be not required to pay for the call; and the callee (e.g., advertisers) may pay the system for the service. In this case, the system may not provide the filtering functionality based on the willingness of the callers to pay. However, the callees (e.g., the advertisers) can still enjoy other benefits from the service provided by the system, such as call scheduling (no night calls), call queuing, toll-free number, local phone number, click-to-call, etc.

In one embodiment, the call buttons and the phone numbers assigned to the callees can also be published in advertisements in marketplaces, online or offline, on behalf of the callees; the callees bid for chances of the publicity and pay the bid amount on a per call basis for calls generated by the advertisements. When the callees generate the phone lead from their own media channel, the callees are only charged for a flat fee for the service of making the connection. Thus, in one embodiment, the system tracks the media channels that lead the caller to make the call.

Figure 15:
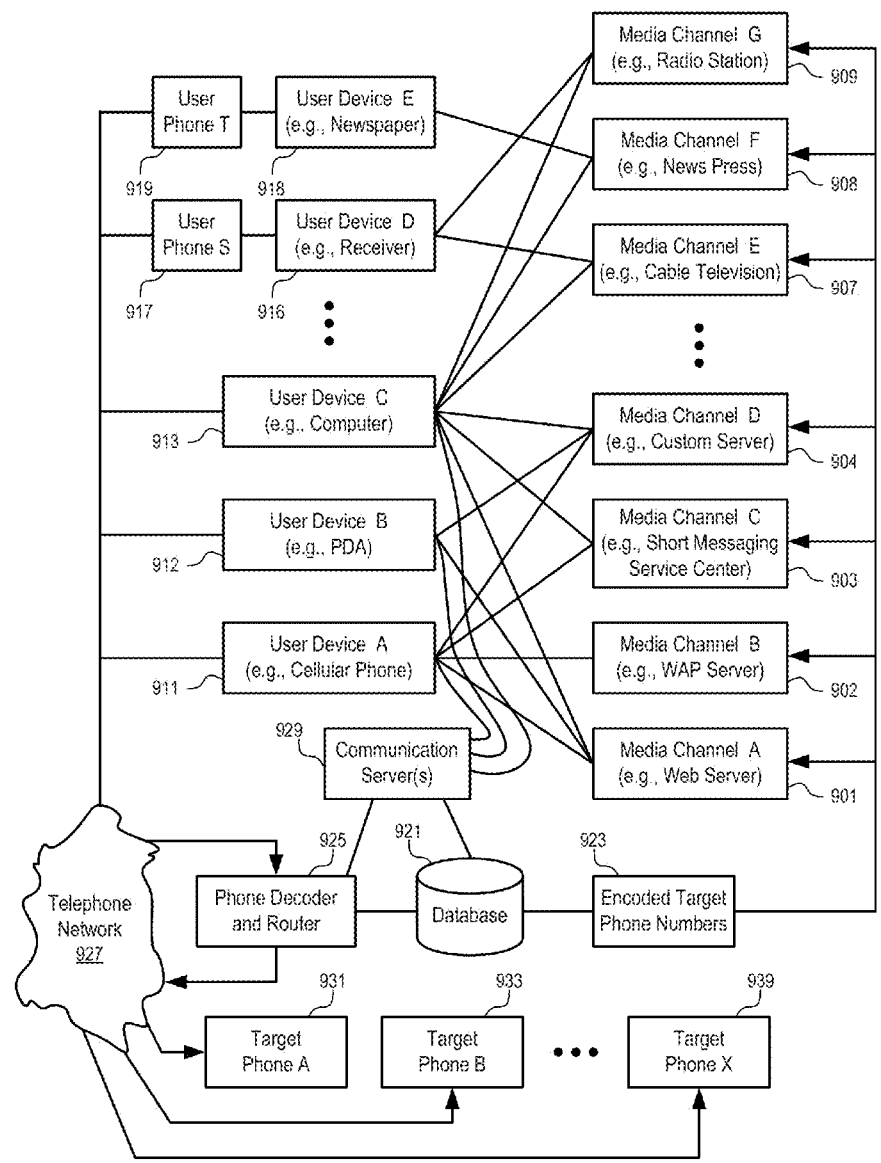
FIG. 15 shows a diagram of a system to assist and track connections according to one embodiment.

FIG. 15 shows a diagram of a system to assist and track connections according to one embodiment.

In FIG. 15, a database (921) may contain the phone numbers of target phone A (931), target phone B (933), . . . , target phone X (939), etc., of callees. Typically, the target phones belong to the institutions, businesses, individuals, etc, which seek for the services of embodiments.

The call button and/or phone numbers assigned to the callees are distributed in various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment, the call buttons and/or the assigned phone numbers, which can be considered as the encoded phone numbers of the callees, are presented in the environment specific to the callees, not in the marketplaces that are specially designed to advertise the callees. Thus, the callees generate the phone leads on their own media distributions, such as their web site or blog site.

Alternatively, or in combination, the call buttons and/or the assigned phone numbers can also be presented in marketplaces, such as in listings/directories of services, advertisements in search results, etc.

In one embodiment, the phone numbers of the target phones are not directly publicized over the media channels. Instead, encoded target phone numbers (923) are used. Using the encoded target phone numbers (923), a user cannot reach target phones directly. Using the encoded target phone numbers (923), a user reaches a server of the system first, which allows the system to provide various services before actually connecting the user to the callee, such as filtering, payment processing, etc.

The encoded target phone numbers (923) allow the association of additional information with the target phone numbers, such as the media channels used, special promotions, etc.

The encoded target phone numbers and/or the call buttons are delivered with content information (e.g., web page, WAP page, short message, television programs, news articles, advertisement, blog, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, etc.).

In one embodiment, a user device is capable of dialing a phone call (e.g., automatically according to the encoded phone number embedded in the content information when a user selects the number). Alternatively, a user may manually dial a phone call using a separate phone, such as user phone S (917) or user phone T (919).

In one embodiment, a user device (e.g., 911, 912, 913) is capable of rendering the call button and sending a message to the communication server(s) (929) when the call button is activated. The call button includes an identifier of the callee so that when the call button is activated the user devices communicate the identifier of the callee to the server(s) (929).

In one embodiment, the user device (e.g., 911) is further capable of automatically identifying a phone number of the caller, or a VoIP identifier of the caller, as a callback number. Alternatively, the user device (e.g., 911, 912, 913) is capable of communicating with the server(s) (929) to present user interfaces to receive the callback number and other parameters, such as the callback time window.

In one embodiment, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the connection to target phone numbers can be paid for on a pay per call basis. Monitoring and tracking the calls can be used for billing the callee and/or the caller.

In one embodiment, the additional information associated with the encoded target phone number is used to tracking phone calls for conditional promotions, electronic coupons, etc. Alternatively, the additional information for conditional promotions, electronic coupons, etc. are retrieved from the database of the listings at the time the corresponding call button is activated or presented, or at the time the encoded phone number is called.

The information about the media channels that are responsible for leading the users to the phone calls to the target phones can also be useful for the advisers. The advisers may wish to know which media channel is more effective in reaching users.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment, an encoded target phone number has more digits than a standard phone number (e.g., having an extension to the standard phone number). A first portion of the encoded target phone number has the same number of digits as a standard phone number to reach the phone decoder and router (925) through the telephone network (927); and a second portion of the encoded target phone number (e.g., the extension) is to be decoded by the phone decoder and router (925). For example, the Dual Tone Multi-Frequency (DTMF)

decoder can be installed in the phone decoder and router (925) to detect the second portion of the encoded target phone number dialed at the user phone. The detected phone number can then be used to recover the target phone number.

In one embodiment, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment, the encoded target phone numbers can have different numbers of digits. The callees may be arranged to bid for shorter encoded target phone numbers.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with other parameters. To prevent revealing the target phone number and the parameters, an encryption/scrambling scheme can be used to encode the second portion, which is decoded at the phone decoder and router (925).

In one embodiment, the phone decoder and router (925) determines the target phone number from the encoded target phone number dialed by the user and then dials the target phone number for the user and joins the phone calls so that the user can talk to the target phone.

In one embodiment, the communication server(s) (929) determines the target phone number from the message sent from the user devices when the call button is pressed.

In one embodiment, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number. Alternatively, the system initiates the VoIP connection to the user device after receiving the message from the user device requesting the phone connection.

In one embodiment, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 15, the user device initiates the phone call. Alternatively, a phone router may be used to initiate phone calls both to the user device (or a separate user phone) and the target phone and then join the phone calls to connect the user to the target phone. For example, when the user selects the call button, the encoded target phone number is transmitted to the communication server(s) (929), which can instruct the phone decoder and router (925) to initiate the phone calls.

The user phone number can be automatically determined through ANI, or through a user preference setting, or through an entry submitted with the selection of the encoded target phone number (e.g., the call button).

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, referring Uniform Resource Locators (URLs) for call buttons embedded in web pages are used to collect directory information and statistic data, which can be used to facilitate searches of call buttons and/or callees.

When a browser follows a link that is embedded a web page to visit a new page, the browser can submit the request for the new page together with a referring URL. The referring URL is the URL of the web page that contains the link which when selected leads the browser to the new page.

In one embodiment, a link or icon that is selectable to request a connection to a callee, via a callback to the requester by a connection provider, is provided by the connection provider for distribution. For example, the callee can present such a link or icon in the blog of the callee and/or in other web sites. When the link or icon is selected by a user in a browser, the browser visits a web page of the connection provider to set up a callback to the requester. Since the referring URL of the request is also received from the browser, the connection provider can associate the URL of the web page with the link or icon. Thus, directory information on which web pages contains links or icons assigned to the callees can be obtained after the callees receive calls from the users who visited the corresponding web pages and used the links or icons.

Alternatively or in combination, an icon button can be configured to request information from the web site of the connection provider when the icon button is rendered in the browser. For example, the icon may be configured to show real time availability information (or a price for the communication time with the callee, or a rating of the callee based on previous user feedbacks). Such information is obtained from the web site of the connection provider for the rendering of the icon. The referring URL of such a request can also be used to associate the URL of the web page with the callee. Since such requests with the presentations/downloads of the web page, such requests can be counted to track the number of presentations/downloads of the web page.

In one embodiment, through collecting the referring URLs, the connection provider can establish a database or directory of web pages containing the links or icons which can be used for requesting connections to the callees (e.g., via callbacks). Since the links or icons represent the callees, the database or directory of web pages can be used to facilitate searches of callees.

For example, the database or directory of web pages can be used to search for communication contact points (e.g., the links or icons assigned to the callees) based on whether the web pages match a search criterion of a search request. Such web pages typically contains more information related to the callees than what the callees might provide to the connection provider in obtaining the assigned links or icons; and the links to the web pages can be used to provide detailed information about the callees and/or what the callees have to offer. Some information (e.g., the names of the callees) provided by the callees to the connection provider should not be revealed or searched for privacy reasons. However, similar information may be available in some of the web pages for some of the callees, which can be very helpful in facilitating a search. Thus, a search based on the web pages that contain the links and icons provides a way to locate the callees in a way the callees would feel conformable with, since the callees choose to publish the web pages with the relevant information and the links or icons for reaching the callees.

In one embodiment, the statistics of connections requested or established via the web pages are tracked. The statistic data reflects the desirability of the connections to the respective callees and/or how successful the web pages are in bringing the web visitors into initiating communication connections with the callees. Thus, the statistic data can be used to rank the web pages in the search result. In one embodiment, the web pages that contain the most used links or icons for requesting connection to the corresponding callees can be presented with a higher priority than others.

For example, the web pages identified in the search result may be grouped according to callees associated with the links or icons for callback requests; the callees may be sorted according to the likelihood of being called in the corresponding web pages (e.g., based on an average conversion rate of the web pages for a callee in the search result, or the highest conversion rate of the web pages for the callee in the search result, etc.); and, the links to the web pages for a given callee may be sorted and selectively presented based on the conversion rate or call volume (e.g., the number of call requested or connected via the web page). Other data related to the usage of the links or icons, such as the frequency calls, the date and time of the last call or presentation, etc., can also be used to determine the rank of the web pages in the search result.

Figure 17:
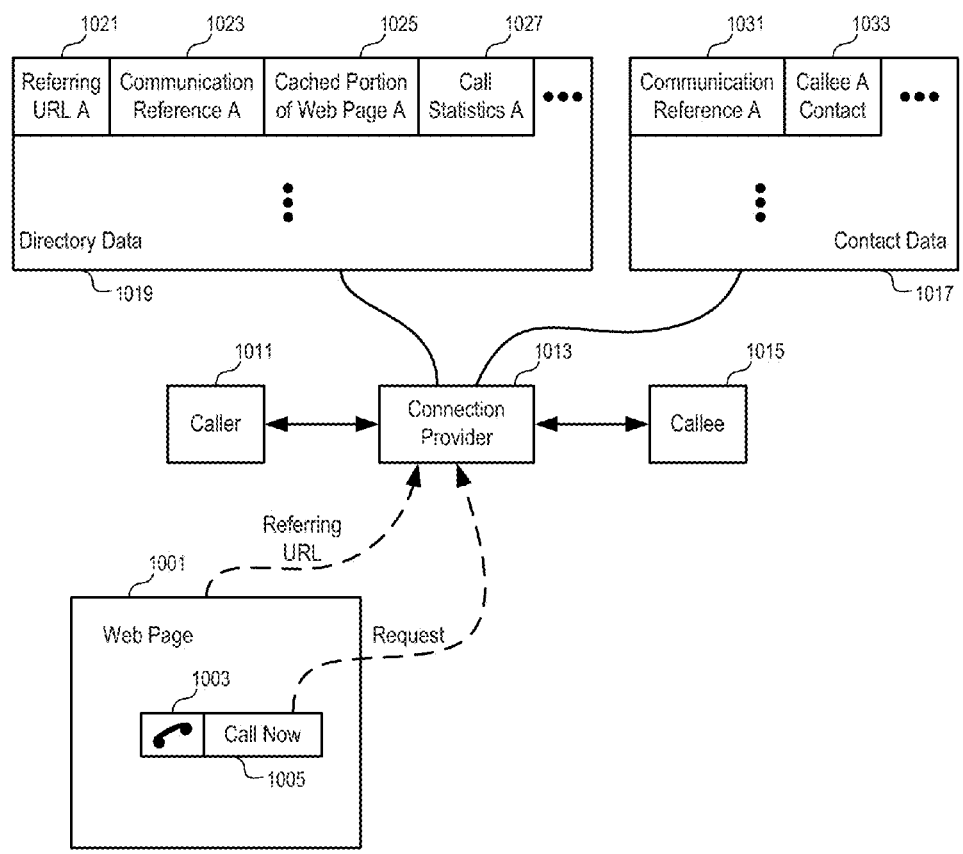
FIG. 17 shows a diagram of a system to collect directory information according to one embodiment.

FIG. 17 shows a diagram of a system to collect directory information according to one embodiment. In FIG. 17, a web page (1001) presented to the caller (1011) includes a button having a text portion (1005) and an image portion (1003). At least one of the text portion (1005) and the image portion (1005) can be used to provide an indication of real time availability status of the callee (1015) for real time communication with the caller (1011). The button includes a communication reference (1031) that is associated with the contact information (1033) of the callee in the contact data (1017) maintained by the connection provider (1013). When the web page (1001) is rendered in a web browser, the request for the real time information is sent to the connection provider (1013) together with the communication reference (1031) and the referring URL (1021). The connection provider (1013) can then store directory data (1019), including the referring URL (1021), the communication reference (1023), a cached portion (1025) of the web page (1001), and/or statistics (1027) for calls connected to the callee (1015) via the communication reference (1023).

Alternatively or in combination, at least a portion of the directory data (1019) that associates the referring URL (1021) and the communication reference (1023) is recorded after the user selects the button (1003 and 1005) to request a connection to the callee (1015) via a callback. In response to the callback request, the connection provider (1013) can make separate calls to the caller (1011) and the callee (1015) and bridge (or join or conference) the calls to connect the caller (1011) and the callee (1015).

For example, Ether buttons can be assigned to callees for publication in callees' environment, such as the web sites or blogs of the callees. When the Ether buttons are used, the referring URL of the Ether buttons are collected to identify the web pages that contain the Ether buttons. The web pages that carry the Ether buttons can be identified based on the referring URLs, without the need to crawl the web. The web pages can be associated with the Ether buttons to provide the context of the Ether buttons and/or detailed information about the callees or the topics of interests to the callers and/or the callees. The identified context information can be used to facilitate searches.

For example, such web pages can be fetched to extract keywords for the indexing of the Ether buttons. When the search term is received from a user, the search term can be matched to the keywords extracted from the web pages to find matching Ether buttons. The Ether buttons can be presented together with links to the web pages that contain the Ether buttons. Thus, the user can view the context of the Ether buttons and then select a callee for the initiation of a request for real time communication connection.

For example, when a search criterion is received from a user in a search for a callee, the search can be formulated based on identifying the relevant web pages that contain embedded Ether buttons of callees. When a web page matches the search criterion, the Ether button and/or the callee of the Ether button that is embedded in the web page is presented, with or without presenting the links to the web page.

For example, the directory of web pages with embedded Ether buttons can be searched according to the search criterion to locate a set of web pages that best match with the user submitted search criterion. Since the web pages contain the corresponding Ether buttons, it is not necessary to present the Ether buttons in the search result. For example, the search result may include a list of the web pages, ranked based on the relevancy to the search criterion and statistics on the usage of the Ether buttons. The list may present the links to the web pages, statistics of the corresponding Ether buttons, relevant parts of the web pages that cause the web pages to be selected, and/or the Ether buttons. In one embodiment, the list may further present listing information of the Ether buttons, such as the brief description provided by the callees for the Ether buttons, price packages for a period of communication time with the callees, feedbacks/rating by previous customers of the callee, a logo or photo of the callee, a listing name, etc. Alternatively, the list may present the web pages without showing the Ether buttons, since the user can readily access the Ether button by visiting the presented web pages.

Alternatively, a search engine can present a list of Ether buttons that represent the callees based on the search result of matching web pages without presenting the links to the matching web pages. Thus, the search engine can be used to search the web for callees that satisfy certain requirements. For example, a user may search for a blogger on a specific topic for a conversation. For example, a user may search an advertiser which is willing to provide valuable advice on a topic for a fee.

In one embodiment, the search is limited to callees who are reachable via the connection provider. Thus, from the search result, the user can easily initiate a connection for real time communication with a callee, if the user is interested in a web page.

Alternatively, the search may not be limited to web pages that contain Ether buttons. When the web page does contain an Ether button, the Ether button is presented with the search result for convenient access.

In one embodiment, an Ether button is used for requesting a phone connection via a callback. Alternatively or in combination, an Ether button can be used for requesting a web page to set up a VoIP based call via the connection provider. Alternatively or in combination, an Ether button can also be used for requesting a connection through a connection provider for communications in email, SMS, and/or instant messaging; and an instant messaging session can support communications in text, image, voice, and/or video.

For example, an Ether button may be used to request a connection for a session of real time communication (e.g., application sharing, or instant messaging); and the communication session is bridged by the connection provider to the callee. For example, an Ether button may be used to request a reference for the initiation of an instant messaging session or a VoIP based call. For example, an Ether button may be used to request a session initiation protocol (SIP) uniform resource identifier (URI) (e.g., a SIP phone number), which when obtained can be used to initiate a VoIP based phone call via the connection provider. In one embodiment, an Ether button may be used to selection one from a plurality of available communication channels (e.g., email, SMS, callback, IM, VoIP, etc.) or a combination of the channels. In one embodiment, the availability indicators of channels are obtained from a web site of the connection provider when the Ether button is rendered in a web browser. Alternatively, different Ether buttons may be provided for accessing a callee via different communication channels.

In one embodiment, listing information for the Ether buttons assigned to the callees can also be collected from the callees. For example, to request for an Ether button, the callee may be prompt to provide a brief description of what the callee would offer to sale over the communication link established via the Ether button, a photo or logo of the callee, and/or one or more categories, etc. A search can be based on both the web pages that contain the Ether buttons and the listing information of the Ether buttons.

In one embodiment, a directory of Ether buttons is generated primarily based on the listing information received from the callees. When presenting the listings, links to the web pages that contain the Ether buttons are also provided. Thus, a caller can visit the relevant web pages to obtain more information related to the callee.

In one embodiment, a directory of Ether buttons/Ether listings is generated based on searching the database of web pages using a pre-determine search criterion (or a search request received from a caller). For example, the directory can show a list of Ether buttons for a particular category, with selected portions of web pages and/or listing information of the Ether buttons highlighted in the list.

In another embodiment, the Ether buttons are not separately presented in the search result. When a searcher sees the results of a query, selecting one of the results (e.g., via a click) causes the browser to load the web page which contains the Ether button. The search can read the web page and select the Ether button embedded in the web page if a communication connection to the callee is desired.

In one embodiment, the directory data collected via referring URL of Ether buttons is used to facilitate the search of callees, where callees are at least partially characterized by the descriptions presented in the web pages that contain the Ether buttons for the corresponding callees. The search result may present the photos/logos of the callees, the Ether buttons, matching portions of the web pages and the links to the web pages.

In one embodiment, the Ether buttons and/or the web pages containing the Ether buttons are ranked based on the degree of matching to the searching criterion and the statistic data collected based on the usage of the communication references. FIG. 18 illustrates statistic data collected to facilitate searches according to one embodiment.

For example, in one embodiment, the number of downloads/presentations (1051) of a web page that contains an Ether button is tracked via referring URL. When a web page containing the Ether button is loaded into a browser, the real time availability of the callee is obtained via the communication reference; and the real time availability is used to determine an appearance of the Ether button. The browser sends the referring URL to obtain the real time availability information. Thus, the number of downloads/presentations (1051) of the web page that contains an Ether button can be tracked.

When the Ether button is selected by the caller to request for a real time communication connection, the communication reference is sent by the browser to the connection provider (e.g., to request the web page that contains the call graph for collecting the call back contact of the caller). Thus, the number of calls (1053) generated from the presentation of the web page that contains the Ether button can be tracked. Further, the connection provider can track the number of successful phone connections (1055) made via the Ether button contained in the web page.

In one embodiment, the connection provider can monitor the communication connections to determine average call time (1057) for calls connected via the Ether button contained in the web page, the average cost of the calls (the fees charged to the caller by the callee for the communication time), the number of repeated/revisit calls (1059) via the Ether button contained in the web page, customer feedback (1061) for calls connected via the Ether button contained in the web page, etc.

Based on the statistic data, the connection provider can determine or estimate the likelihood of availability of callees in view of past successful rate in reaching the callees, and/or the conversion rate, such as the ratio between a count of presentation of the web pages and requests for connections generated from the presentation of the web pages, or the ratio between a count of presentation of the web pages and established connections resulted from the presentation of the web pages, etc.

Using the directory data and the call statistics, the web pages can be indexed, searched and sorted for locating persons or entities which are reachable at least via the connection provider.

Figure 19:
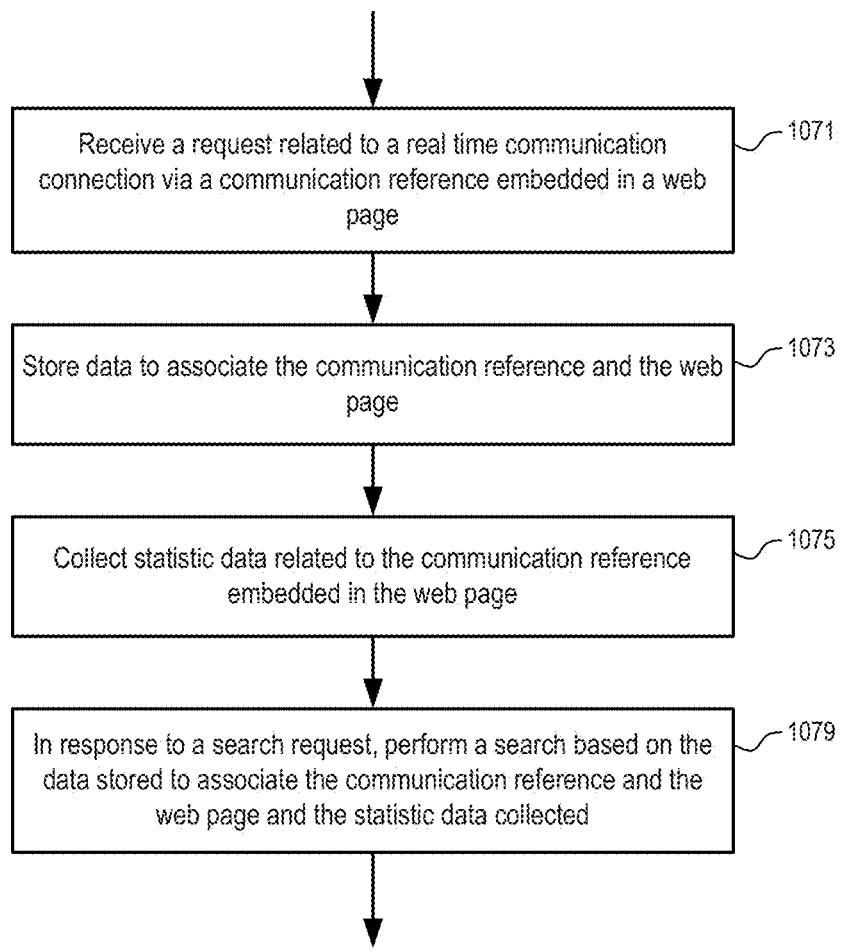
FIG. 19 illustrates a method to facilitate searches according to one embodiment.

FIG. 19 illustrates a method to facilitate searches according to one embodiment. In FIG. 19, a request related to a real time communication connection is received (1071) via a communication reference embedded in a web page. In one embodiment, the communication reference has been assigned to represent, or associated with, the contact information of a callee; and the reference can be used to request a connection for real time communication with the callee. Data is stored to associate (1073) the communication reference and the web page (e.g., based on the referring URL). Statistic data related to the communication reference embedded in the web page is collected (1075). In response to a search request, a search is performed (1079) based on the data stored to associate the communication reference and the web page and the statistic data collected.

In one embodiment, a web page is presented to collect call back information from a caller in response to the request related to the real time communication connection. A real time communication contact of the callee, such as a telephone reference, is determined based on the communication reference. And, the real time communication connection is established via calling back the caller using the collected call back information and call the callee separately using the real time communication contact of the callee determined based on the communication reference.

In one embodiment, the real time communication connection is established via: making a first telephone connection to the caller using the call back information; making a second telephone connection to the callee using the telephonic reference; and joining the first and second telephone connections to connect the caller and the callee. In one embodiment, at least one of the first and second telephone connections is at least partially via Voice over Internet Protocol (VoIP).

In one embodiment, the request related to the real time communication connection includes a Universal Resource Locator (URL) of the web page as a referring URL; and the data stored to associate the communication reference and the web page includes the URL of the web page. In one embodiment, the web page is further obtained using the URL to index the web page in association with the communication reference or to index the communication reference in association with the web page.

In one embodiment, statistic data related to real time communication requests made via the communication reference embedded in the web page and/or statistic data related to real time communication connections made via the communication reference are collected. For example, the collected statistic data may includes an average communication time duration per connection established via the communication reference, an average fee charged by the callee per connection established via the communication reference, a rate of repeated communication requests, and/or a rate of success connections to the callee among connection requests. In one embodiment, the statistic data is used to rank the web pages or the communication references in the search result.

In one embodiment, the number of downloads of the web page is determined based on embedding the communication reference in the web page; and a rate of communication requests generated from downloads of the web page is further determined.

In one embodiment, a real time availability of the callee is determined in response to the request; and the referring URL for the determination of the real time availability is used to count the number of downloads or presentations of the web page.

In one embodiment, the determination of whether or not to include the communication reference in a response to the search request is made based at least partially on the data stored to associate the communication reference with the web page.

In one embodiment, when the communication reference is included in the response to the search request, a Universal Resource Locator (URL) of the web page is provided together with the communication reference.

In one embodiment, a plurality of web pages are ranked according to at least statistic data related real time communication requests made via communication references embedded in the web pages, in response to the search request.

Figure 20:
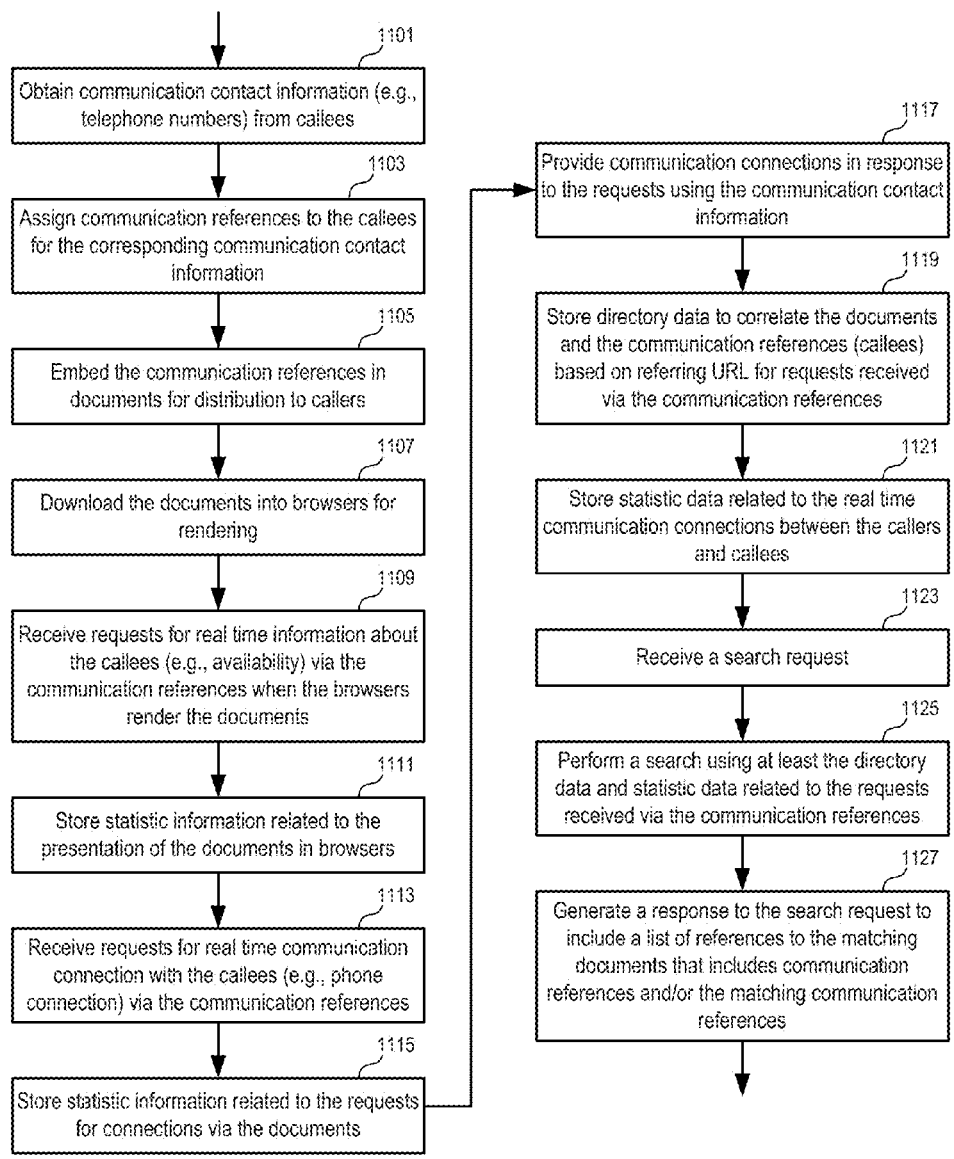
FIG. 20 illustrates an example to facilitate searches according to one embodiment.

FIG. 20 illustrates an example to facilitate searches according to one embodiment. In FIG. 20, communication contact information (e.g., a telephone number) is obtained (1101) from callees. The telephone number may be a plain old telephone number that can be dialed on a plain old telephone system, or a VoIP-based telephone number, such as a session initiation protocol (SIP) uniform resource identifier (URI). In one embodiment, the communication contact information can be used to establish a connection to the callee for real time communication in voice, text, image, audio and/or video. For example, the communication contact information can be used to establish an instant messaging session for application sharing and/or chat in text, voice, and/or video.

Communication references are then assigned (1103) to the callees for the corresponding communication contact information. The communication references are embedded (1105) in documents for distribution to callers. The documents are downloaded (1107) into browsers for rendering. When documents are rendered in the browsers, requests for real time information about the callees are received (1109) from the browsers via the communication references. For example, the documents can be configured to causes the browsers to request information on availability of the callees during the rendering of the documents. In one embodiment, the information on availability is presented on an icon for requesting the real time communication connection with the callees. Alternatively or in combination, other types of information, such as pricing, user feedback, etc., can also be requested.

Since the request for such real time information is related to the presentation or download of the document, statistic information related to the presentation of the documents in the browsers can be collected and stored. (1111).

After receiving (1113) the requests for real time communication connection with the callees (e.g., phone connection) via the communication references (e.g., when the user selects the icons for requesting a callback), the statistic information related to the requests for connections via the documents can be collected and stored (1115).

In response to the requests for real time communication connection, the communication connections are provided (1117) using the communication contact information that have been obtained (1101) from the callees. In one embodiment, the communication contact information is looked up from a database according to the communication references. Alternatively, the communication references may include an encoded/encrypted version of the communication references, which can be decoded/decrypted without relying upon a database.

In FIG. 20, directory data are stored (1119) to correlate the documents and the communication references (callees), based on the referring URL for the requests received via the communication references. Further, statistic data related to the real time communication connections between the callers and the callees are stored (1121).

In FIG. 20, when a search request is received (1123), a search is performed (1125) using at least the directory data and statistic data related to the requests received via the communication references. For example, the search result may be limited to the documents that contain at least one assigned communication reference; and the search result may be sorted based at least in part on the statistic data related to the presentation of the documents in the browsers, the statistic data related to requests for connections via the documents, the statistic data related to real time communication connections between the callers and the callees, etc. A response to the search request then is generated (1127) to include a list of search results. The search results may include the matching communication references and/or references to the matching documents that include communication references.

Figure 16:
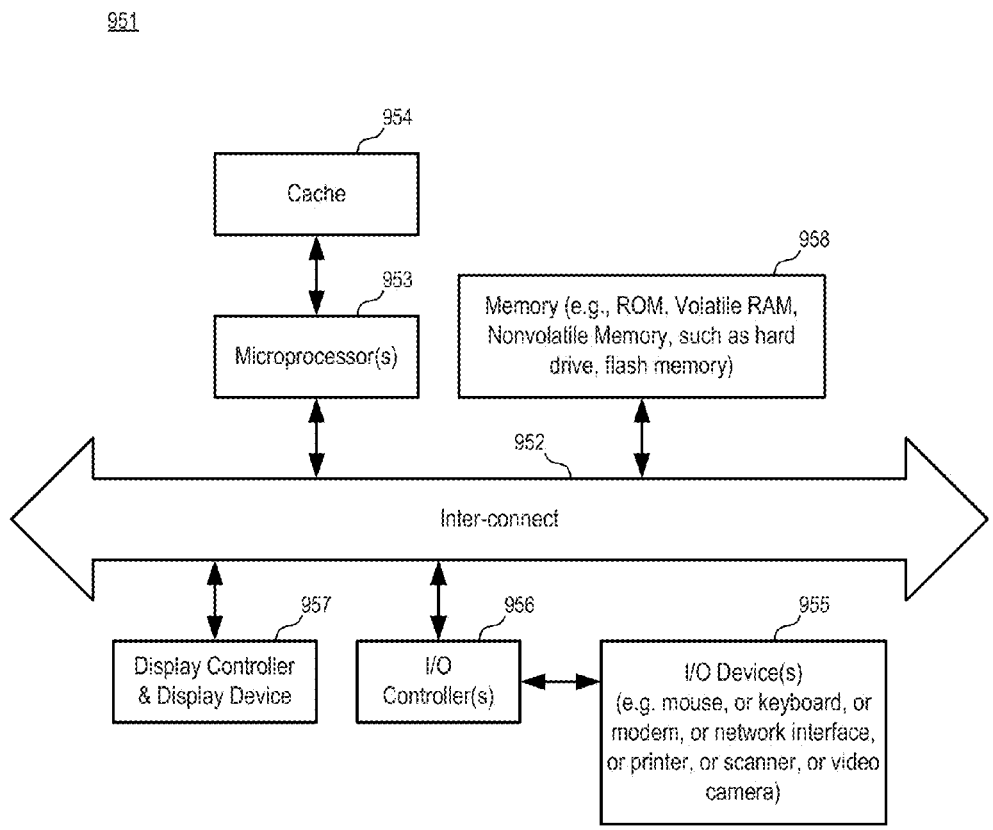
FIG. 16 shows a block diagram example of a data processing system which may be used with various embodiments.

FIG. 16 shows a block diagram example of a data processing system which may be used with various embodiments.

While FIG. 16 illustrates various components of a computer system, it is not intended to represent any particular architecture or manner of interconnecting the components. Other systems that have fewer or more components may also be used.

In FIG. 16, the communication device (951) is a form of a data processing system. The system (951) includes an inter-connect (952) (e.g., bus and system core logic), which interconnects a microprocessor(s) (953) and memory (958). The microprocessor (953) is coupled to cache memory (954) in the example of FIG. 16.

The inter-connect (952) interconnects the microprocessor(s) (953) and the memory (958) together and also interconnects them to a display controller and display device (957) and to peripheral devices such as input/output (I/O) devices (955) through an input/output controller(s) (956). Typical I/O devices include mice, keyboards, modems, network interfaces, printers, scanners, video cameras and other devices which are well known in the art.

The inter-connect (952) may include one or more buses connected to one another through various bridges, controllers and/or adapters. In one embodiment the I/O controller (956) includes a USB (Universal Serial Bus) adapter for controlling USB peripherals, and/or an IEEE-1394 bus adapter for controlling IEEE-1394 peripherals.

The memory (958) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 16 is used as one of the communication server(s) (e.g., 929, 925, and/or 921 in FIG. 15, 1013 in FIG. 17).

Further, a user terminal as a client system can be a data processing system similar to the system of FIG. 16. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

Alternatively, the traditional communication client(s) may be used in some embodiments.

From this description, it will be appreciated that certain aspects are embodied in the user devices, certain aspects are embodied in the server systems, and certain aspects are embodied in a system as a whole.

Embodiments can be implemented using hardware, programs of instruction, or combinations of hardware and programs of instructions.

Figure 21:
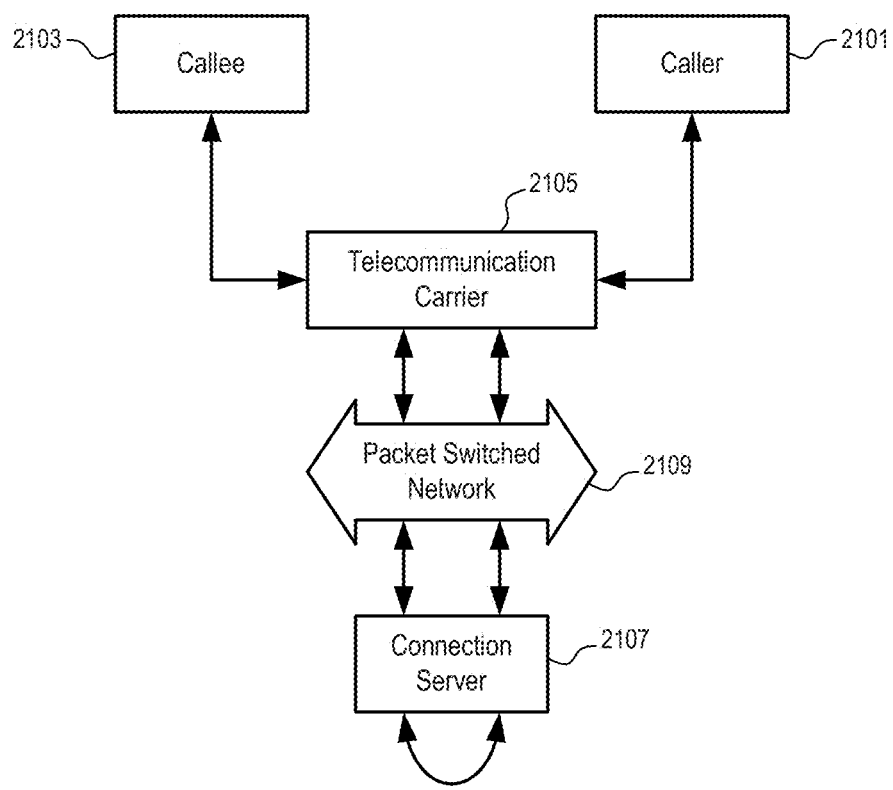
FIG. 21 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 21. In FIG. 21, the connection server (2107) receives and/or places telephone calls via the telecommunication carrier (2105) over the packet switched network (2109). The telecommunication carrier (2105) further routes the telephone communications towards the caller (2101) and the callee (2103).

Since the telecommunication carrier (2105) can route a call from a packet switched network to a variety of destinations (e.g., a traditional analog telephone set, a mobile phone, a cellular phone, a WiFi phone, a Bluetooth phone, a softphone running on a computer, etc.), the connection sever (2107) can use one type of communication connection with the telephone carrier (2105) to facilitate the communication connections with variety of devices used by the customers (e.g., callers and callees). Thus, the implementation of the connection server (2107) can be simplified. In one embodiment, the connection server (2107) can also place and/or receive direct VoIP calls to/from the caller (or callee).

For example, to make a voice connection in response to a click-to-call request, the connection server can place separate VoIP calls, via the telecommunication carrier (2105), to the caller (2101) (e.g., the requester of the click-to-call) and the callee (2103) (e.g., the destination of the click-to-call request).

If the caller (2101) (or the callee 2103) is on a public switched telephone network (PSTN), the telecommunication carrier (2105) bridges the packet switched the network and the public switched telephone network (PSTN). The telecommunication carrier (2105) routes the call from the packet switched network (2109) to the caller (2101) (or the callee 2103) on the circuit switched network. Thus, the caller (2101) (or the callee 2103) can use a telephone set to receive the call via a Plain Old Telephone Service (POTS). The connection server (2107) joins the separate calls that are placed via the packet switched network (2109) to connect the callee (2103) and the caller (2101).

In one embodiment, call signaling and media content may use different network paths. While call signaling is arranged to go through the packet switched network (2109) and the connection server (2107), the media stream does not have to go through the connection server (2107). For example, when the calls are joined, the media content may be redirected to flow over the communication carrier (2105) without going through the packet switched network (2109) to the connection server (2107) for improved performance and efficiency. The connection server (2107) can release the control over the media stream to allow the media stream to flow through the shortest path, without going through the connection server, while maintaining control to the connection for the call by staying on the path for call signaling.

In another example, when the caller (2101) initiates a call over a PSTN to the connection server (2107), the telecommunication carrier (2105) converts the call for the packet switched network (2109) for the connection server (2107).

In one embodiment, virtual softphones on the telecommunication carrier (2105) are assigned to the caller (2101) and the callee (2103) for interfacing with the connection server (2107) over the packet switched network (2109). The virtual softphones encapsulates the devices and networks used by the caller (2101) and callee (2103) to access the connection server (2107); and the telecommunication carrier (2105) shields the connection server (2107) from the implementation details of the user devices and networks used by the caller (2101) and the callee (2103). The connection server (2107) calls (or receives calls from) and connects the virtual softphones on the telecommunication carrier (2105) to connect the caller (2101) and the callee (2103).

In FIG. 21, the telephone connection between the telecommunication carrier (2105) and the connection server (2107) is facilitated via a packet switched network (2109). Thus, the connection server (2107) can operate efficiently in a digital domain. The connection server (2107) interfaces with the telecommunication carrier (2105) using one type of Internet Telephony systems (e.g., SIP-based Internet telephony).

Alternatively, a connection server may include some or all of the functionality of the telecommunication carrier (2105). For example, the connection server may be configured to bridge a packet switched network and a circuit switched network. The connection server may support multiple, different types of Internet Telephony systems.

In one embodiment, the connection server (2107) and the telecommunication carrier (2105) are operated by different, separate entities. Alternatively, the connection server (2107) and the telecommunication carrier (2105) may be operated by the same entity. In another embodiment, the telecommunication carrier (2105) includes a set of facilities operated by a number of separate entities.

In one embodiment, the caller (2101) and/or the callee (2103) may also place/receive calls via a packet switched network. The telecommunication carrier (2105) may route the calls between the caller (2101) and the callee (2103) without using a PSTN. In one embodiment, caller (2101) and/or the callee (2103) may place calls to or receive calls from the connection server (2107) via Internet.

Figure 22:
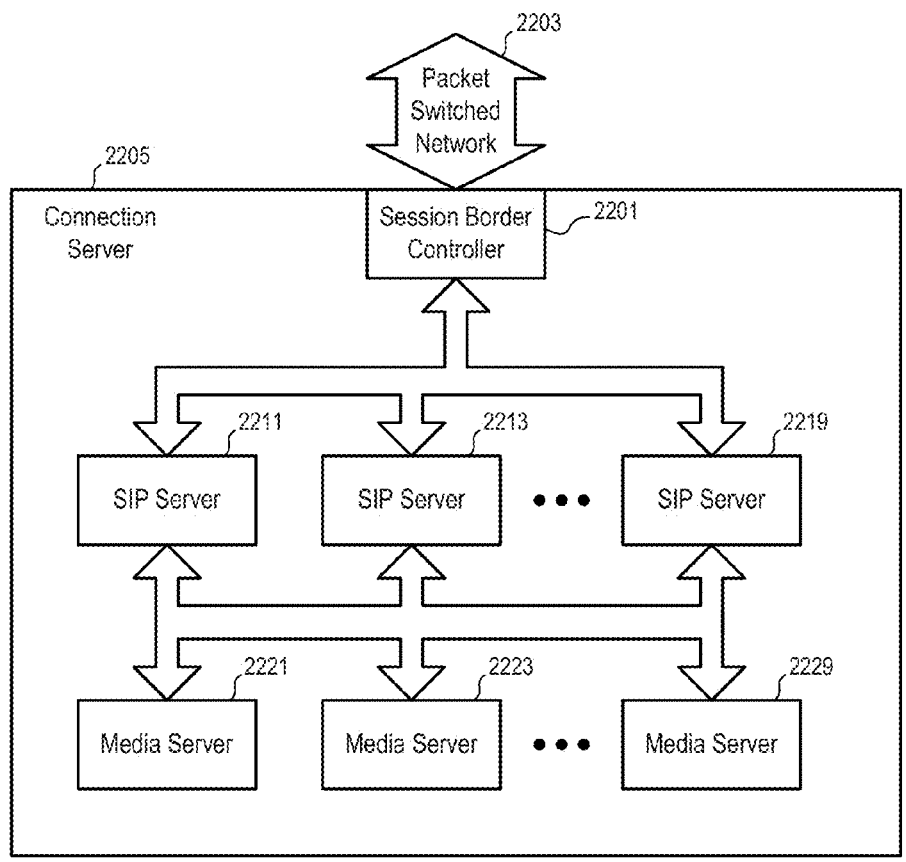
FIG. 22 shows a connection server according to one embodiment.

FIG. 22 shows a connection server according to one embodiment. In FIG. 22, the connection server (2205) is configured to place and/or receive VoIP calls using Session Initiation Protocol (SIP). A session border controller (2201) is used to interface with the packet switched network (2203) and control the types of network traffic related to VoIP calls that might go into the connection server (2205).

In one embodiment, the session border controller (2205) is configured to control the signaling and media stream during the setting up, conducting and tearing down of VoIP calls to or from the connection server (2205). In some embodiments, the session border controller (2205) may pick up the call that comes to the session border controller (2205), places a separate call from the session border controller (2205), and joins the received call and the placed call to control both the signaling and media stream. In some embodiments, the session border controller (2205) may perform signaling/encoding translation to allow the connection server (2205) to process the VoIP calls in one standard, while receiving VoIP calls in a variety of standards (e.g., SIP, H.323, etc.). In one embodiment, the session border controller (2205) is configured to perform one or more firewall functionalities, such as denial of service protection, call filtering, bandwidth management, etc.

In one embodiment, the session border controller (2205) is configured to perform media releasing operation. When the session border controller (2205) determines that the source and destination of a media stream is on the same side of the session border controller (2205) (e.g., both the source and the destination of the media stream is outside the connection server 2205), the session border controller (2205) can release the hairpinning of the media stream and allow the media stream to flow without going through the session border controller (2205).

In FIG. 22, a set of SIP servers (e.g., 2211, 2213, ..., 2219) are networked to the session border controller (2201) to receive messages for incoming calls and to initiate outgoing calls. The session border controller (2201) is configured to evenly distribute the calls for processing by the SIP servers.

For example, when an incoming message for the initiation of a call is received (e.g., a SIP INVITE message from the telecommunication carrier 2105), the session border controller (2201) may route it to a SIP server (e.g., 2211) for processing. The INVITE message includes the phone number dialed by the caller and the contact information about the caller (e.g., the phone number of the caller 2101 and/or the identity of the virtual SIP phone at the telecommunication carrier 2105).

The SIP server may determine whether the phone number dialed by the caller (2103) is sufficient to determine the phone number of the callee (e.g., 2103). If the phone number of the callee (e.g., 2103) can be determined from the phone number dialed by the caller (2103) (e.g., via decoding the phone number dialed by the callee, or looking up the phone number of the callee from a table using the phone number dialed by the caller as a key), the SIP server can place a separate SIP call to the callee via the packet switched network (2203) and then connect the caller and the callee. Alternatively, the SIP server can further route the SIP INVITE message (e.g., to the telecommunication carrier (2105) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (2221) (or a virtual softphone on SIP server) as the initiator for a separate call. The SIP server then connects the calls for the media stream.

In one embodiment, the caller is first connected to a media server (e.g., 2221, 2223, or 2229). For example, the SIP server may forward the SIP INVITE message to one or more of the media servers for answering the call. When a media server (e.g., 2221) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (2203) (e.g., by sending a SIP INVITE message to the telecommunication carrier 2105, which further bridges the call to the callee 2103). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (2201) into the connection server (2205). For example, the media stream can go through the telecommunication carrier (2105) in FIG. 21 without going to the connection server (2107) after the SIP server connects the caller and the callee.

However, the SIP server stays on the signaling path to monitor the progress and termination of the call. The SIP server can also break the connection between the caller and the callee, or force the media stream to come through the connection serve (2205). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (2203) for a connection to the caller. The SIP call may be bridged onto a circuit switched network (e.g., by a telecommunication carrier 2105). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (2211, 2213, ..., 2219) and media servers (2221, 2223, ..., 2229) are implemented on separate computers connected via a local area network (and/or intranet or Internet). Alternatively, at least the some of the servers can be implemented on a same computer. In one embodiment, the SIP servers and the media servers are also integrated with the session border controller (2201) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (2205) may further include a database server (2205) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In one embodiment, an Ether button or phone number assigned to an advisor is associated with one or more keywords. The advisor can place bids on the keywords. When a keyword is searched, the Ether button/number having the highest bid on the keyword is presented. In one embodiment, the Ether buttons/numbers that match the keyword are ranked based at least in part on the bids on the keywords; and the ranked Ether buttons/numbers are selectively presented in the search result. In one embodiment, the bids and the prices charged by the advisors are used to estimate the earning potentials for presenting the Ether buttons/numbers; and the Ether buttons/numbers that match the keywords are presented in an order according to the estimated earning potentials, which may include the consideration of the conversion ratio between the presentations of the Ether buttons/numbers and the customer calls generated from the presentations, an average customer spending on the advisor, and/or the rate of returning customers to the advisor.

Figure 23:
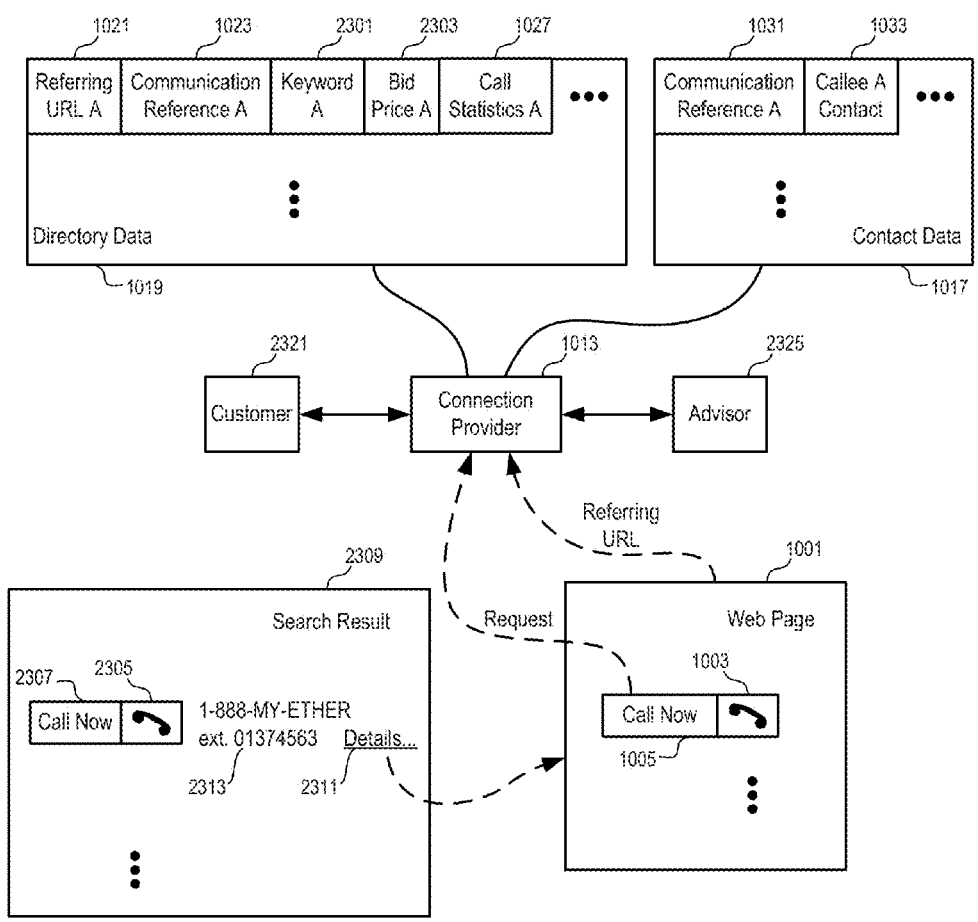
FIG. 23 shows a diagram of a system to facilitate searches according to one embodiment.

FIG. 23 shows a diagram of a system to facilitate searches according to one embodiment. In FIG. 23, a communication reference A (1023) is assigned to the advisor (2325) for distribution in a document (1001) of the advisor (2325). The document may be an email from the advisor (2325), a web home page of the advisor (2325), a blog page of the advisor (2325), or a business card of the advisor (2325), etc.

In FIG. 23, the communication reference A (1023) may be a link to a call button assigned to the advisor (2325) and/or a telephone number of the advisor (2325). The telephone number may or may not have an extension, may be a toll free telephone number or a telephone number local to a business location of the advisor, or a session initiation protocol (SIP) uniform resource identifier (URI), or a Voice over Internet Protocol (VoIP) user identifier.

For example, when the communication reference A (1023) includes a link to a call button assigned to the advisor (2325), the advisor (2325) can embed the link in the web page (1001) for presentation to the customer (2321). When the link to the call button is rendered in the web page (1001), the connection provider (1013) provides information about the button having a text portion (1005) and an image portion (1003). In some embodiments, the text portion or the image portion may be not shown. In one embodiment, at least one of the text portion (1005) and the image portion (1005) can be used to provide an indication of real time availability status of the advisor (2325) for real time communication with the customer (2321). In one embodiment, the availability status of the advisor (2325) for real time communication is determined based at least in part on comparing the time the call button is requested and a pre-scheduled callable period of the advisor (2325). For example, the advisor (2325) may specify a daily (or weekly or monthly) schedule which indicates the time period outside which the advisor (2325) is not willing to take calls from customers. For example, the advisor (2325) may directly specify whether the advisor (2325) is currently available to take calls from customers (e.g., via a web interface or a telephone portal of the connection provider).

In FIG. 23, the communication reference (1031) is associated with the contact information (1033) of the advisor in the contact data (1017) maintained by the connection provider (1013). When the connection provider (1013) receives a request for a connection to the advisor via the communication reference (1031) that is assigned to the advisor (2325), the connection provider (1013) connects the customer (2321) to the advisor (2325) without revealing the contact information (1033) to the customer (2321).

In FIG. 23, the connection provider (1013) also maintains directory data (1019) which may include a keyword (2301) associated with the communication reference (1023), the bid price (2303) of the keyword (2301), call statistics (1027), etc. The directory data (1019) may further include a description, a title, customer feedback, a customer rating of the advisor, etc.

In FIG. 23, the directory data (1019) also includes a referring URL (1021) which contains an address of the web page (1001) in which the advisor (2325) has placed the link to the call button (1003). The directory data (1019) may further include a cached portion of the web page (1001).

In FIG. 23, the directory data (1019) is used to facilitate the search for communication references of the advisors.

In one embodiment, after a search request is received (e.g., via a web server of the connection provider), the directory data (1019) is searched to find communication references that have associated keywords that match the search request. The matching communication references can be sorted or ranked according to the directory data (1019) to priorities the presentation of the matching communication references.

For example, the connection provider (1013) may present one or more communication references that are ranked in the top based on their bid prices. For example, the connection provider (1013) may present one or more communication references that are ranked in the top based on estimated earning potentials.

In one embodiment, the connection provider (1013) can charge the advisors based on the bid prices they placed on the keywords when the communication references presented in the search result are called. In one embodiment, the connection provider (1013) can charge the advisors based on the bid prices they placed on the keywords when the communication references are presented in the search result. The connection provider (1013) can further charge the advisors a commission fee based on the prices the advisors specified to charge the customers for real time communications with the advisors. Based on the likelihood of a presentation of the communication reference being converted into a chargeable event, the connection provider (1013) can estimate the earning potential of the presentation of the communication references and prioritize the presentation of the communication references according to their earning potentials.

In FIG. 23, the search result (2309) presented via a web server of the connection provider (1013) includes a call button having a text portion (2307) and an image portion (2305) to indicate the availability of the advisor at the time of the search result (2309). The search result (2309) further includes a phone number (2313) which can be used by the customer (2321) to reach the connection provider (1013) via a plain old telephone set to request a telephone connection to the advisor (2325). The search result (2309) further includes a link (2311) which can be selected by the customer (2321) to visit the web page (1001) of the advisor (2325). The search result (2309) may further include the brief description provided by the advisors for the Ether buttons, price packages for a period of communication time with the advisors, feedbacks/rating by previous customers of the advisor, a logo or photo of the advisor, a listing name, a link to the web page (1001), etc.

In on embodiment, the call button may be associated with multiple keywords with different bid prices; and the bid prices may be changed by the advisor (2325). The call button (2307 and 2305) can further include one or more parameters to specify the keyword responsible for the selection of the call button for presentation and the bid price of the keyword at the time the call button is selected for presentation. When the call button is selected, the parameters are also transmitted to the connection provider to identify the keyword and bid price. For example, in one embodiment, the bid price is a maximum bid, which is to be determined according to the bid price of the next competitor who has a bid on the same keyword. For example, the advertisement fee is charged based on the bid prices of the keyword at the time of the presentation of the call button. Alternatively, the advertisement fee can be charged based on the bid prices of the keyword at the time the call button is selected by the customer (2321) for a connection to the advisor (2325).

In one embodiment, the ether number (2313) presented in the search results includes addition digits to track the keyword and/or bid prices.

In one embodiment, the system uses the tracked information about the keywords to determine the conversion rate of the presentations of the call button (and/or the assigned telephone numbers) for specify keywords. The conversion rate can be used to improve the accuracy in estimating the earning potential of a presentation.

In one embodiment, the keyword (2301) is extracted from the web page (1001) which includes the call button (1003) embedded by the advisor (2325). Alternatively, the advisor (2325) may separately select the keywords independently on the web page (1001) while placing the bids on the keywords.

In one embodiment, when the search result includes an advisor that does not provide the bid price (2303) (e.g., the bid price is zero or below a threshold), the search result is presented to include a link to the web page of the advisor based on the referring URL, without directly presenting the call button or the ether number. Thus, the search result indirectly presents the communication reference assigned to the advisor via a link to the web page of the advisor which contains the communication reference assigned to the advisor. Alternatively, the search result may also directly present the communication reference assigned to the advisor.

Figure 24:
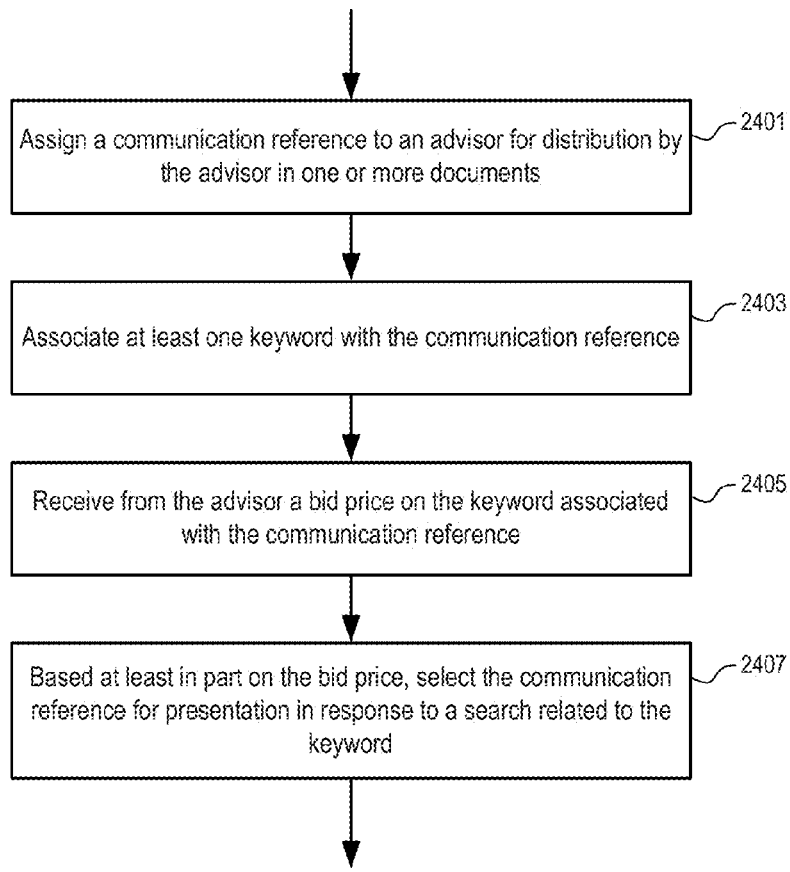
FIG. 24 shows a method to facilitate the search of communication references according to one embodiment.

FIG. 24 shows a method to facilitate the search of communication references according to one embodiment. In FIG. 24, a communication reference is assigned (2401) to an advisor for distribution by the advisor in one or more documents, such as a business card, an email from the advisor, a blog of the advisor, or a web home page of the advisor. The communication reference is to be used by customers of the advisor to request for connections to the advisor for real time communications with the customers of the advisor. The communication reference may be a telephone number of a connection provider, a session initiation protocol (SIP) uniform resource identifier (URI), a Voice over Internet Protocol (VoIP) user identifier of the connection provider, or a link to a server of the connection provider.

In FIG. 24, at least one keyword is associated (2403) with the communication reference; and a bid price is received (2405) from the advisor on the keyword associated with the communication reference. In response to a search related to the keyword, the communication reference is selected (2407) for presentation based at least in part on the bid price.

In one embodiment, responsive to a request received via the communication reference from a customer for a communication connection to the advisor, contact information of the advisor is determined based on the communication reference; and the customer is connected to the advisor for real time communications using the contact information determined based on the communication reference.

In one embodiment, it is determined whether the request is received via a presentation of the communication reference as a result of the search. For example, when the referring URL of the call button selected is a search result, the request can be determined as a result of the search. For example, the ether phone number presented in the search result may include one or more extra digits of extension to indicate that the ether phone number is a result of the search. In response to a determination that the request is received as a result of the search, charging the advisor a fee based on the bid price per connecting the customer to the advisor for real time communications via the communication reference. The advisor is not charged the fee when the request is received as a result of a presentation of the communication reference in the one or more documents distributed by the advisor.

In one embodiment, the advisor is charged a fee based on the bid price per connecting the customer to the advisor for real time communications via the communication reference. In one embodiment, the bid price is a maximum bid; and the fee is determined based on the bid price and a bid price on the keyword by a competitor of the advisor.

In one embodiment, a connection provider charges the customer on behalf of the advisor for services delivered by the advisor over a connection established between the customer and the advisor via the communication reference assigned to the advisor.

In one embodiment, a connection provider establishes a first Voice over Internet Protocol (VoIP) connection to connect to the customer using the communication reference, determines contact information of the advisor based on the communication reference used to establish the first VoIP connection, establishes a second Voice over Internet Protocol (VoIP) connection to connect to the advisor using the contact information of the advisor, and bridges the first and second VoIP connections to connect the customer and the advisor. In one embodiment, a media connection that does not go through the connection provider is established to connect the customer and the advisor for telephone communications.

In one embodiment, information to present the communication reference is provided in a document that shows the result of the search. The information to present the communication reference may further include an indicator of availability of the advisor for real time communications with customers at a time the information is provided, a price specified by the advisor for charging customers for real time communications with the advisor, and/or a link to the one or more documents distributed by the advisor. In one embodiment, the indicator of availability is based on a scheduled time period.

In one embodiment, the communication reference is associated with an address of the one or more documents of the advisor in responsive to the communication reference in the one or more documents being selected to request for a communication connection with the advisor; and the link includes a reference to the address of the one or more documents.

In one embodiment, the communication reference is further selected according to an average communication time duration per connection established via the communication reference, an average fee charged by the advisor per connection established via the communication reference, a rate of repeated communication requests, or a rate of success connections to the advisor among connection requests.

In one embodiment, a system includes: one or more web servers to assign a communication reference to an advisor for distribution by the advisor in one or more documents, to associate at least one keyword with the communication reference, to receive from the advisor a bid price on the keyword associated with the communication reference, and to present the communication reference selected based at least in part on the bid price in response to a search related to the keyword; a session border controller to interface with a packet switched network; one or more telecommunication servers coupled to the session border controller and the one or more web servers to determine contact information of the advisor based on the communication reference used by a customer to request a communication connection to the advisor, and to connect the customer to the advisor for real time communications using the contact information determined based on the communication reference.

In one embodiment, the one or more telecommunication servers are to establish a first Voice over Internet Protocol (VoIP) connection to connect to the customer using the communication reference, establish a second Voice over Internet Protocol (VoIP) connection to connect to the advisor using the contact information of the advisor and to bridge the first and second VoIP connections to connect the customer and the advisor.

In one embodiment, the one or more web servers are to further determine an address of the one or more documents in response to the communication reference being selected from the one or more documents distributed by the advisor and to present a link to the address with the communication reference as a result of the search.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions for implementation. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been provided with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    a processor; and
    a memory coupled to at least the processor, the memory having instructions stored thereon which when executed by the processor are configured to:
    assign a communication reference to an advisor for distribution by the advisor in a document, the communication reference usable to request connections to the advisor for real time communications with the advisor;
    associate a keyword with the communication reference;
    receive from the advisor a bid price on the keyword associated with the communication reference;
    select, based at least in part on the bid price, the communication reference for presentation in response to a search related to the keyword, wherein the communication reference includes a price specified by the advisor for charging for real time communications with the advisor;
    responsive to a request from a customer using the communication reference, the request being for a communication connection to the advisor, determine contact information of the advisor based on the communication reference;
    connect the customer to the advisor for the real time communications with the advisor using the contact information determined based on the communication reference;
    determine whether the request from the customer is received via a presentation of the communication reference as a result of the search; and
    charge the advisor a fee based on the bid price per connecting, based at least in part on the communication reference, the customer to the advisor for the real time communications, in response to a determination that the request is received as a result of the search.

2. The system of claim 1, wherein the processor is further configured to:
    establish a first voice over Internet protocol connection to connect to the customer using the communication reference;
    establish a second voice over Internet protocol connection to connect to the advisor using the contact information of the advisor; and
    bridge the first and second voice over Internet protocol connections to connect the customer and the advisor.

3. The system of claim 1, wherein the processor is further configured to determine an address of the document in response to the communication reference being selected from the document distributed by the advisor and to present a link to the address with the communication reference as a result of the search.

4. The system of claim 1 wherein the processor is further configured to charge the customer on behalf of the advisor for services delivered by the advisor consequent to the connecting the customer to the advisor for real time communications with the advisor.

5. The system of claim 1 wherein the communication reference comprises a telephone number of a connection provider, a session initiation protocol uniform resource identifier, or a voice over Internet protocol user identifier of the connection provider.

6. The system of claim 1 wherein the processor is further configured to determine the fee based on the bid price received from the advisor, and a bid price on the keyword by a competitor of the advisor.

7. The system of claim 2 wherein the processor is further configured to bridge the first and second voice over Internet protocol connections by establishing a media connection that does not go through the connection provider to connect the customer and the advisor for telephone communications.

8. The system of claim 1, wherein memory further includes instructions which when executed are configured to cause the advisor to not be charged the fee when the request from the customer is received as a result of a presentation of the communication reference in the document distributed by the advisor.

9. A method comprising:
    assigning, using a computing device, a communication reference to an advisor for distribution by the advisor in a document, the communication reference usable to request connections to the advisor for real time communications with the advisor;

associating, using the computing device, a keyword with the communication reference;

receiving from the advisor a bid price on the keyword associated with the communication reference;

selecting, using the computing device, based at least in part on the bid price, the communication reference for presentation in response to a search related to the keyword, wherein the communication reference includes a price specified by the advisor for charging for real time communications with the advisor;

responsive to a request from a customer using the communication reference, the request being for a communication connection to the advisor, determining contact information of the advisor based on the communication reference;

connecting the customer to the advisor for the real time communications with the advisor using the contact information determined based on the communication reference;

determining whether the request from the customer is received via a presentation of the communication reference as a result of the search; and charging the advisor a fee based on the bid price per connecting, based at least in part on the communication reference, the customer to the advisor for the real time communications, in response to a determination that the request is received as a result of the search.

10. The method of claim 9, further comprising:

a connection provider establishing a first voice over Internet protocol connection to connect to the customer using the communication reference;

the connection provider establishing a second voice over Internet protocol connection to connect to the advisor using the contact information of the advisor; and bridging the first and second voice over Internet protocol connections to connect the customer and the advisor.

11. The method of claim 9, further comprising:

determining an address of the document in response to the communication reference being selected from the document distributed by the advisor; and presenting a link to the address with the communication reference as a result of the search.

12. The method of claim 9, further comprising charging the customer on behalf of the advisor for services delivered by the advisor consequent to the connecting the customer to the advisor for real time communications with the advisor.

13. The method of claim 9 wherein the communication reference comprises one of a telephone number of a connection provider, a session initiation protocol uniform resource identifier, or a voice over Internet protocol user identifier of the connection provider.

14. The method of claim 9 further comprising determining the fee based on the bid price received from the advisor, and a bid price on the keyword by a competitor of the advisor.

15. The method of claim 10 further comprising bridging the first and second voice over Internet protocol connections by establishing a media connection that does not go through the connection provider to connect the customer and the advisor for telephone communications.

16. The method of claim 9, wherein the advisor is not charged the fee when the request from the customer is received as a result of a presentation of the communication reference in the document distributed by the advisor.

17. A tangible non-transitory machine-readable medium, storing instructions that, when executed by a computing device, cause the computing device to perform a method, the method comprising:

assigning, using a computing device, a communication reference to an advisor for distribution by the advisor in a document, the communication reference usable to request connections to the advisor for real time communications with the advisor;

associating, using the computing device, a keyword with the communication reference;

receiving from the advisor a bid price on the keyword associated with the communication reference;

selecting, using the computing device, based at least in part on the bid price, the communication reference for presentation in response to a search related to the keyword, wherein the communication reference includes a price specified by the advisor for charging for real time communications with the advisor;

responsive to a request from a customer using the communication reference, the request being for a communication connection to the advisor, determining contact information of the advisor based on the communication reference;

connecting the customer to the advisor for the real time communications with the advisor using the contact information determined based on the communication reference;

determining whether the request from the customer is received via a presentation of the communication reference as a result of the search; and charging the advisor a fee based on the bid price per connecting, based at least in part on the communication reference, the customer to the advisor for the real time communications, in response to a determination that the request is received as a result of the search.

18. The medium of claim 17, further comprising:

a connection provider establishing a first voice over Internet protocol connection to connect to the customer using the communication reference;

the connection provider establishing a second voice over Internet protocol connection to connect to the advisor using the contact information of the advisor; and bridging the first and second voice over Internet protocol connections to connect the customer and the advisor.

19. The medium of claim 17, further comprising:

determining an address of the document in response to the communication reference being selected from the document distributed by the advisor; and presenting a link to the address with the communication reference as a result of the search.

20. The medium of claim 17, further comprising charging the customer on behalf of the advisor for services delivered by the advisor consequent to the connecting the customer to the advisor for real time communications with the advisor.

21. The medium of claim 17 wherein the communication reference comprises one of a telephone number of a connection provider, a session initiation protocol uniform resource identifier, or a voice over Internet protocol user identifier of the connection provider.

22. The medium of claim 17 further comprising determining the fee based on the bid price received from the advisor, and a bid price on the keyword by a competitor of the advisor.

23. The medium of claim 17, wherein the advisor is not charged the fee when the request from the customer is received as a result of a presentation of the communication reference in the document distributed by the advisor.

* * * * *